US012801213B2

(12) United States Patent
Lee et al.

(10) Patent No.: US 12,801,213 B2
(45) Date of Patent: Nov. 17, 2026

(54) WEARABLE DEVICE, METHOD, AND NON-TRANSITORY COMPUTER READABLE STORAGE MEDIUM FOR CHANGING VIRTUAL BOUNDARY SIDE

(71) Applicant: SAMSUNG ELECTRONICS CO., LTD., Suwon-si (KR)

(72) Inventors: Chaeeun Lee, Suwon-si (KR); Sungoh Kim, Suwon-si (KR); Donghyun Yeom, Suwon-si (KR); Sanghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/282,619

(22) Filed: Jul. 28, 2025

(65) Prior Publication Data

US 2026/0056602 A1 Feb. 26, 2026

Related U.S. Application Data

(63) Continuation of application No. PCT/KR2025/009454, filed on Jul. 2, 2025.

(30) Foreign Application Priority Data

Aug. 23, 2024 (KR) ........................ 10-2024-0113892
Oct. 16, 2024 (KR) ........................ 10-2024-0140970

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0101* (2013.01); *G02B 27/017* (2013.01);
(Continued)

(58) Field of Classification Search
CPC .... G06F 3/011; G06F 3/04815; G06F 3/0346; G06F 3/012; G06V 40/10; G06V 40/28;
(Continued)

(56) References Cited

U.S. PATENT DOCUMENTS 10,803,663 B2 10/2020 Wang et al.
10,901,215 B1 * 1/2021 Newcombe ........ G02B 27/0172
(Continued)

FOREIGN PATENT DOCUMENTS

CN 115662095 A 1/2023
JP 2019 537087 A 12/2019
(Continued)

OTHER PUBLICATIONS

Communication dated Oct. 29, 2025, issued by the International Searching Authority in International Application No. PCT/KR2025/009454 (PCT/ISA/210 and PCT/ISA/237).

*Primary Examiner* — Richard J Hong
(74) *Attorney, Agent, or Firm* — Sughrue Mion, PLLC

(57) ABSTRACT

A wearable device includes at least one display, at least one sensor, memory storing instructions, and at least one processor comprising processing circuitry. The instructions, when executed by the at least one processor individually or collectively, cause the wearable device to display, via the at least one display, a screen representing a virtual space set a virtual boundary side and a safety zone surrounded by the virtual boundary, receive user input to adaptively expand the safety zone from a user wearing the wearable device, and after receiving the user input, identify the user's hand moving outside the safety zone, identify an external object located outside the safety zone, and based on location information of the external object and expansion length information corresponding to a length from the wearable device to the hand, change the virtual boundary side to expand the safety zone.

20 Claims, 16 Drawing Sheets

(51) Int. Cl.
*G06Q 10/0639* (2023.01)
*G06V 40/10* (2022.01)
*G06V 40/20* (2022.01)

(52) U.S. Cl.
CPC ....... *G06Q 10/06398* (2013.01); *G06V 40/10* (2022.01); *G06V 40/28* (2022.01); *G02B 2027/0138* (2013.01); *G02B 2027/014* (2013.01); *G02B 2027/0178* (2013.01)

(58) Field of Classification Search
CPC .............. G02B 27/0101; G02B 27/017; G02B 2027/0138; G02B 2027/014; G02B 2027/0178; G02B 27/0172; G06Q 10/06398; G06T 15/04; A63F 13/212; A63F 13/211
See application file for complete search history.

(56) References Cited

U.S. PATENT DOCUMENTS

| | | | | |
|---|---|---|---|---|
| 10,909,759 | B2 | 2/2021 | Kaino et al. | |
| 11,094,107 | B2 | 8/2021 | Kunigita et al. | |
| 11,361,512 | B2 | 6/2022 | Chaurasia et al. | |
| 11,391,944 | B2 | 7/2022 | Kawano | |
| 11,972,040 | B2 | 4/2024 | Johnson et al. | |
| 11,989,844 | B2 | 5/2024 | Lee | |
| 12,084,026 | B2 | 9/2024 | Gaudin et al. | |
| 12,260,146 | B2 | 3/2025 | Kim et al. | |
| 2016/0025982 | A1* | 1/2016 | Sutherland | G06F 3/04815 359/13 |
| 2016/0350973 | A1* | 12/2016 | Shapira | G06F 3/011 |
| 2017/0359569 | A1 | 12/2017 | Stafford | |
| 2018/0093186 | A1* | 4/2018 | Black | A63F 13/211 |
| 2018/0373412 | A1* | 12/2018 | Reif | G06F 3/04815 |
| 2019/0033989 | A1* | 1/2019 | Wang | G06F 3/0346 |
| 2019/0043259 | A1* | 2/2019 | Wang | G06F 3/012 |
| 2020/0064908 | A1* | 2/2020 | Boucher | A63F 13/212 |
| 2021/0173471 | A1* | 6/2021 | Johnson | G06F 3/011 |
| 2021/0183135 | A1* | 6/2021 | Lin | G06T 15/04 |
| 2023/0103172 | A1* | 3/2023 | Lee | G06F 3/011 345/633 |
| 2025/0322614 | A1* | 10/2025 | Lee | G06F 3/011 |

FOREIGN PATENT DOCUMENTS

| | | | |
|---|---|---|---|
| JP | 2022-177492 | A | 12/2022 |
| KR | 10 2024 0037805 | A | 3/2024 |
| KR | 10 2024 0094945 | A | 6/2024 |

* cited by examiner

WEARABLE DEVICE, METHOD, AND NON-TRANSITORY COMPUTER READABLE STORAGE MEDIUM FOR CHANGING VIRTUAL BOUNDARY SIDE

CROSS-REFERENCE TO RELATED APPLICATION(S)

This application is a continuation application, claiming priority under § 365(c), of an International application No. PCT/KR2025/009454, filed on Jul. 2, 2025, which is based on and claims the benefit of a Korean patent application number 10-2024-0113892, filed on Aug. 23, 2024, in the Korean Intellectual Property Office, and of a Korean patent application number 10-2024-0140970, filed on Oct. 16, 2024, in the Korean Intellectual Property Office, the disclosure of each of which is incorporated by reference herein in its entirety.

BACKGROUND

1. Field

The disclosure relates to a wearable device, a method, and a non-transitory computer readable storage medium for changing a virtual boundary side.

2. Description of Related Art

In order to provide enhanced user experience, an electronic device that provides an augmented reality (AR) service displaying information generated by a computer in connection with an external object in the real-world is being developed. The electronic device may be a wearable device capable of being worn by a user. For example, the electronic device may be AR glasses and/or a head-mounted device (HMD).

SUMMARY

According to an aspect of the disclosure, there is provided a wearable device including: at least one display, at least one sensor, memory storing instructions; and at least one processor including processing circuitry. The instructions, when executed by the at least one processor individually or collectively, may be configured to: display, via the at least one display, a screen representing a virtual space including a virtual boundary side extended from a plane corresponding a floor and a safety zone corresponding to the virtual boundary, receive a first input to adaptively expand the safety zone from a user wearing the wearable device, and based on the first input, identify, based on hand tracking information, a hand of the user moving outside the safety zone, identify, via the at least one sensor, a first object located outside the safety zone, and change, based on location information of the first object and expansion length information corresponding to a length from the wearable device to the hand of the user, the virtual boundary side to expand the safety zone, the expanded safety zone excluding a first area corresponding to the location information of the first object.

According to another aspect of the disclosure, there is provided a method performed by a wearable device including at least one display and at least one sensor, the method including: displaying, via the at least one display, a screen representing a virtual space including a virtual boundary side extended from a plane corresponding a floor and a safety zone corresponding to the virtual boundary, receiving a first input to adaptively expand the safety zone from a user wearing the wearable device, and based on the first input, identifying, based on hand tracking information, a hand of the user moving outside the safety zone, identifying, via the at least one sensor, a first object located outside the safety zone, and changing, based on location information of the first object and expansion length information corresponding to a length from the wearable device to the hand of the user, the virtual boundary side to expand the safety zone, the expanded safety zone excluding a first area corresponding to the location information of the first object.

According to another aspect of the disclosure, there is provided a non-transitory computer readable storage medium storing one or more programs, the one or more programs including instructions to, when executed by a wearable device with at least one display and at least one sensor, cause the wearable device to: display, via the at least one display, a screen representing a virtual space including a virtual boundary side extended from a plane corresponding a floor and a safety zone corresponding to the virtual boundary, receive first input to adaptively expand the safety zone from a user wearing the wearable device, and based on the first input, identify, based on hand tracking information, the user's hand moving outside the safety zone, identify, via the at least one sensor, a first object located outside the safety zone, and change, based on location information of the first object and expansion length information corresponding to a length from the wearable device to the hand of the user, the virtual boundary side to expand the safety zone, the expanded safety zone excluding a first area corresponding to the location information of the first object.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Terms used in the disclosure are used only to describe a specific embodiment, and may not be intended to limit a range of another embodiment. A singular expression may include a plural expression unless the context clearly means otherwise. Terms used herein, including a technical or a scientific term, may have the same meaning as those generally understood by a person with ordinary skill in the art described in the disclosure. Among the terms used in the disclosure, terms defined in a general dictionary may be interpreted as identical or similar meaning to the contextual meaning of the relevant technology and are not interpreted as ideal or excessively formal meaning unless explicitly defined in the disclosure. In some cases, even terms defined in the disclosure may not be interpreted to exclude embodiments of the disclosure.

In various embodiments of the disclosure described below, a hardware approach will be described as an example. However, since the various embodiments of the disclosure include technology that uses both hardware and software, the various embodiments of the disclosure do not exclude a software-based approach.

Terms referring to data (e.g., data, information, hand tracking information, expansion length information, user information, skill level), terms referring to a value (e.g., threshold value, value, coordinate information, coordinate, length, reduced amount), terms for an operational state (e.g., operation, process), terms referring to instructions, Terms referring to a network entities, terms referring to a component of a device, and the like, that are used in the following description, are exemplified for convenience of description. Therefore, the disclosure is not limited to the terms described below, and another term having the same technical meaning may be used.

In addition, in the disclosure, the term 'greater than' or 'less than' may be used to determine whether a particular condition is satisfied or fulfilled, but this is only a description to express an example and does not exclude description of 'greater than or equal to' or 'less than or equal to'. A condition described as 'greater than or equal to' may be replaced with 'greater than', a condition described as 'less than or equal to' may be replaced with 'less than', and a condition described as 'greater than or equal to and less than' may be replaced with 'greater than and less than or equal to'. In addition, hereinafter, 'A' to 'B' refers to at least one of elements from A (including A) to B (including B). Hereinafter, 'C' and/or 'D' means including at least one of 'C' or 'D', that is, {'C', 'D', and 'C' and 'D'}.

Figure 1:
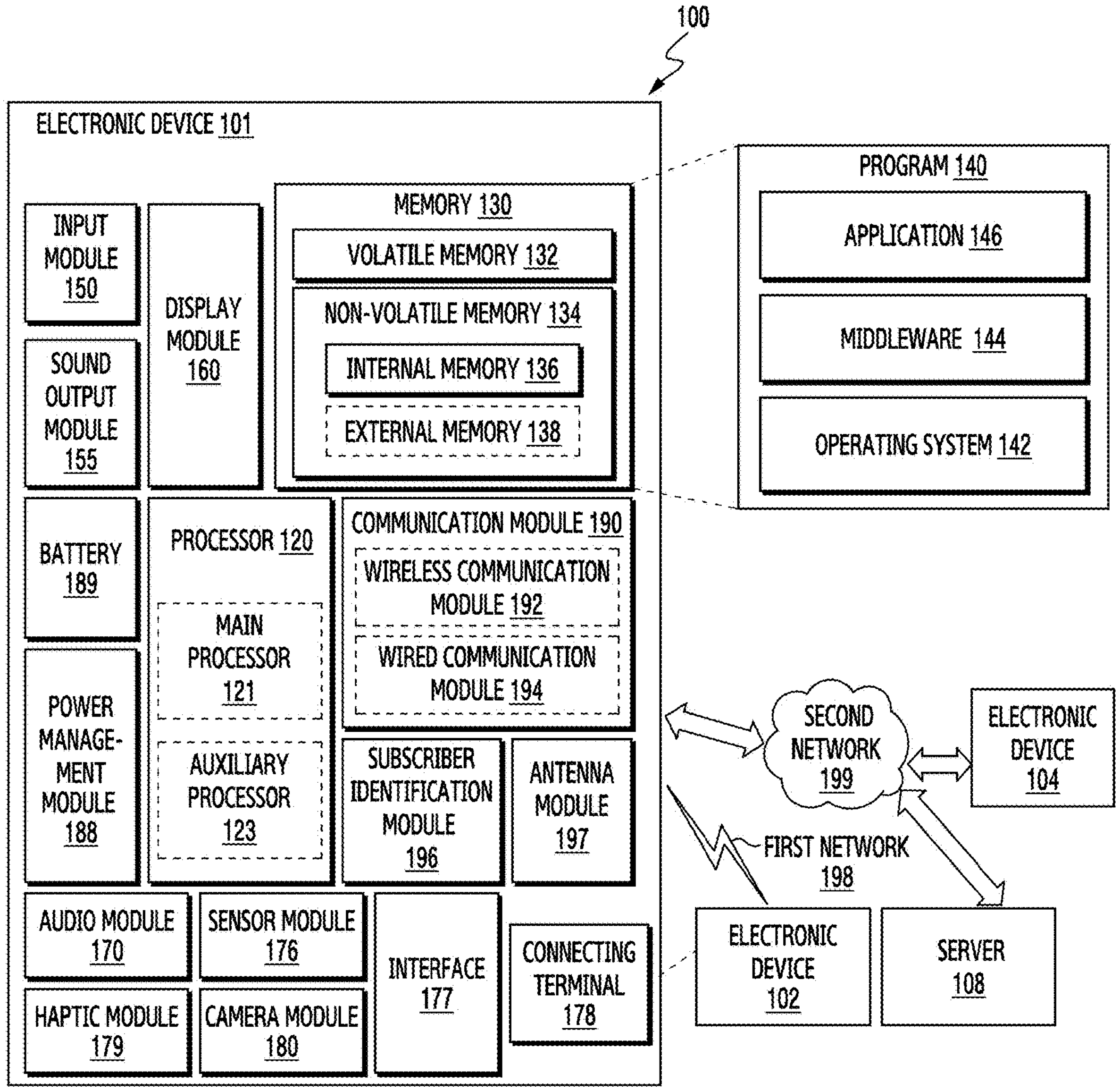
FIG. 1 is a block diagram of an electronic device in a network environment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. In an example case in which the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC provided on a first surface (e.g., the bottom surface) of the printed circuit board, or adjacent to the first surface and capable of supporting a designated high-frequency band (e.g., the mmWave band), and a plurality of antennas (e.g., array antennas) provided on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. In an example case in which the electronic device 101 should perform a function or a service automatically, or based on (or in response to) a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In embodiments of the disclosure, an electronic device (e.g., the electronic device 101 of FIG. 1) for displaying a screen representing a virtual space may be a wearable device. The wearable device 101 may include a head-mounted display (HMD) wearable on a head of a user. The wearable device 101 may be referred as a head-mounted device (HMD), a headgear electronic device, a glasses-type electronic device, a video see-through or visible see-through (VST) device, an extended reality (XR) device, a virtual reality (VR) device and/or an augmented reality (AR) device. Although an appearance of the wearable device 101 having a form of glasses is illustrated, the disclosure is not limited thereto, and as such, according to another embodiment, the wearable device 101 may have another form. An example of a hardware configuration included in the wearable device 101 is exemplarily described with reference to FIG. 4. An example of a structure of the wearable device 101 wearable on a head of a user (e.g., a user 700 of FIG. 7A) is described with reference to FIGS. 2A, 2B, 3A and/or 3B. The wearable device 101 may be referred to as an electronic device. For example, the electronic device may form the HMD by being coupled with an accessory (e.g., a strap) for being attached to the head of the user.

The wearable device 101 according to an embodiment may execute a function related to augmented reality (AR) and/or mixed reality (MR). For example, in a state in which the user is wearing the wearable device 101, the wearable device 101 may include at least one lens provided adjacent to eyes of the user. The wearable device 101 may combine ambient light passing through the lens with light emitted from a display of the wearable device 101. A display area of the display may be formed within the lens through which the ambient light passes. Since the wearable device 101 combines the ambient light and the light emitted from the display, the user may see an image in which a real object recognized by the ambient light and a virtual object formed by the light emitted from the display are mixed. The augmented reality, the mixed reality, and/or the virtual reality described above may be referred to as extended reality (XR).

The wearable device 101 according to an embodiment may execute a function related to the video see-through or the visible see-through (VST) and/or the virtual reality (VR). For example, in a state in which the user is wearing the wearable device 101, the wearable device 101 may include a housing that covers the eyes of the user. In the state, the wearable device 101 may include a display provided on a first surface of the housing facing the eyes. The wearable device 101 may include a camera provided on a second surface opposite to the first surface. Using the camera, the wearable device 101 may obtain an image and/or a video representing ambient light. The wearable device 101 may output the image and/or the video in the display provided on the first surface to enable the user to recognize the ambient light via the display. A displaying area (or a displaying region) or an active area (or an active region) of the display provided on the first surface may be formed by one or more pixels included in the display. The wearable device 101 may synthesize a virtual object with the image and/or video outputted via the display to enable the user to recognize the virtual object together with the real object recognized by the ambient light.

The wearable device 101 according to an embodiment may identify or recognize a position (or a location) and/or a direction (or an orientation) of the wearable device 101 based on the image (and/or the video) obtained (or acquired) by using the camera. The wearable device 101 may obtain information on the external space by using one or more cameras and/or one or more sensors. The information may include a geographic location (e.g., a global positioning system (GPS) coordinate) of an external space identified from the one or more sensors. The information may include an image and/or a video of an external space identified from the one or more cameras. The wearable device 101 may identify external objects included in the external space from the image and/or the video by performing object recognition with respect to the image and/or the video.

Hereinafter, an example of a hardware configuration of the wearable device 101 will be described with reference to FIGS. 2A, 2B, 3A, 3B, and 4.

Figure 2A:
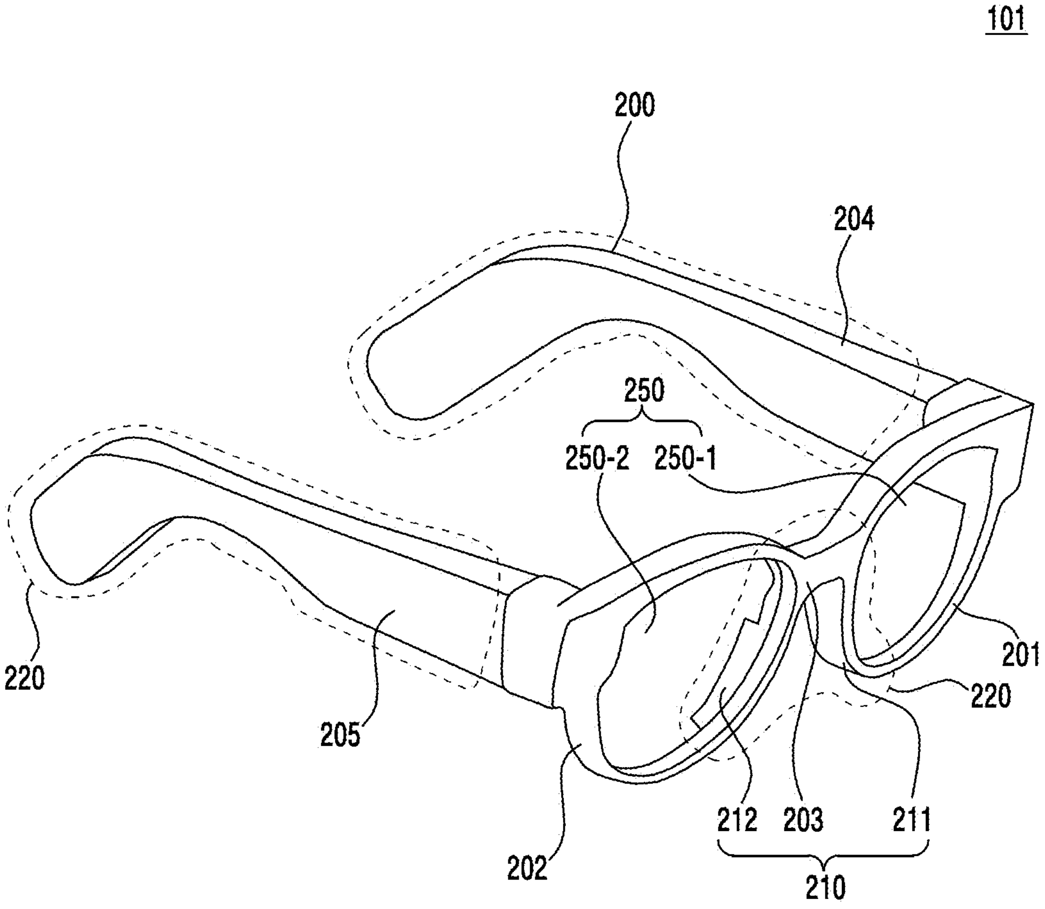
FIG. 2A illustrates an example of a perspective view of a wearable device.
Figure 2B:
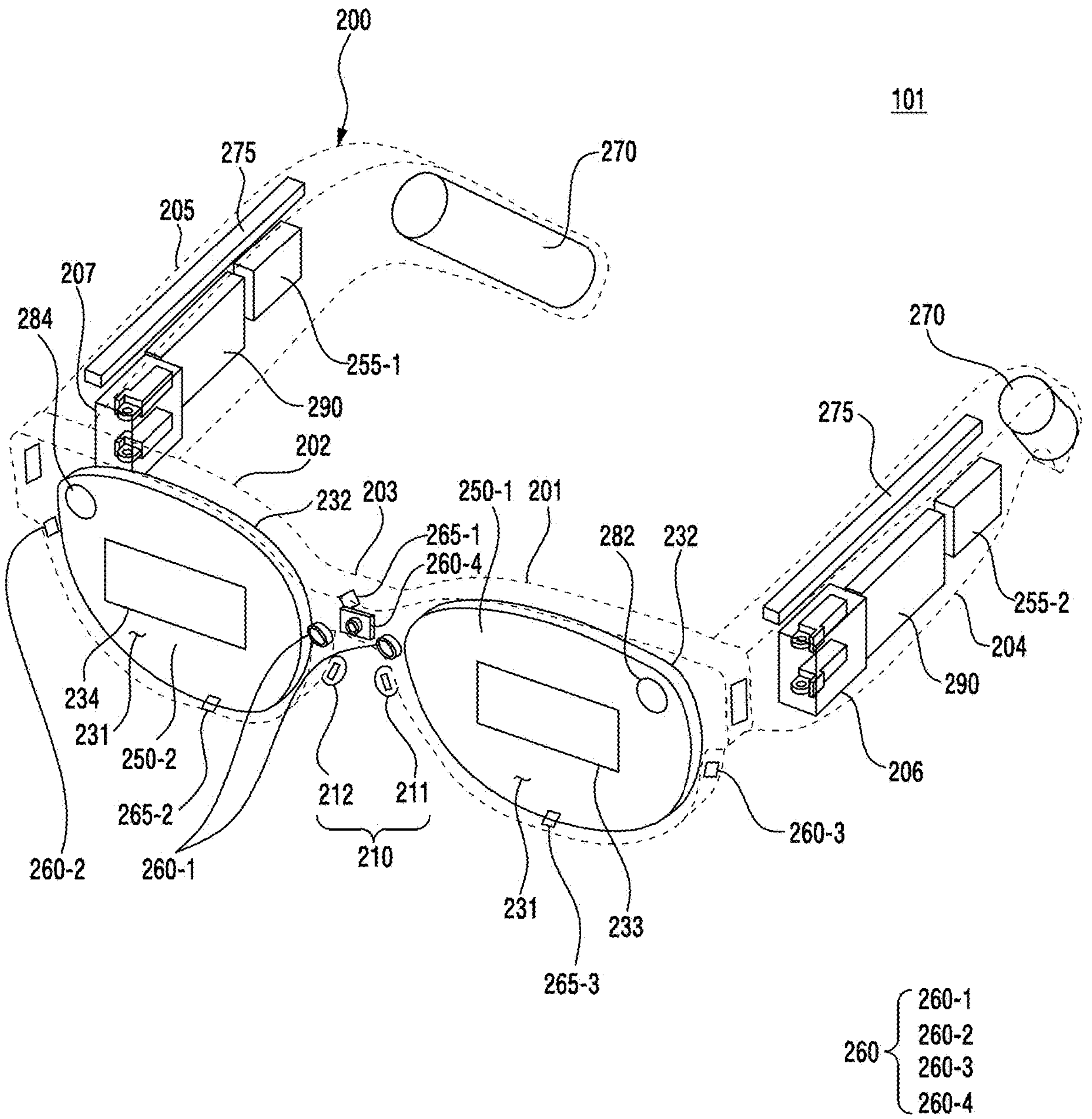
FIG. 2B illustrates an example of one or more hardware provided in a wearable device.

FIG. 2A illustrates an example of a perspective view of a wearable device. FIG. 2B illustrates an example of one or more hardware provided in the wearable device. An wearable device 101 according to an embodiment may have a shape of glasses that are wearable on a body part (e.g., a head) of the user. The wearable device 101 of FIGS. 2A to 2B may be an example of the electronic device 101 of FIG. 1. The wearable device 101 may include a head-mounted display (HMD). For example, a housing of the wearable device 101 may include a flexible material such as rubber and/or silicone, having a shape that is in close contact with a portion (e.g., a portion of a face surrounding both eyes) of the head of the user. For example, the housing of the wearable device 101 may include one or more straps that is able to be twined around the head of the user and/or one or more temples attachable to an ear of the head.

Referring to FIG. 2A, according to an embodiment, a wearable device 101 may include at least one display 250 and a frame 200 supporting the at least one display 250.

According to an embodiment, the wearable device 101 may be wearable on a portion of the user's body. The wearable device 101 may provide augmented reality (AR), virtual reality (VR), or mixed reality (MR) combining the augmented reality and the virtual reality to a user wearing the wearable device 101. For example, the wearable device 101 may display a virtual reality image provided from at least one optical device 282 and 284 of FIG. 2B on at least one display 250, based on a preset gesture of a user. For example, the wearable device 101 may display a virtual reality image in response to the preset gesture of the user obtained through a motion recognition camera 260-2 and 260-3 of FIG. 2B.

According to an embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be provided at positions corresponding to the user's left and right eyes, respectively.

Referring to FIG. 2B, the at least one display 250 may provide visual information transmitted through a lens included in the at least one display 250 from ambient light to a user and other visual information distinguished from the visual information. The lens may be formed based on at least one of a fresnel lens, a pancake lens, or a multi-channel lens. For example, the at least one display 250 may include a first surface 231 and a second surface 232 opposite to the first surface 231. A display area may be formed on the second surface 232 of at least one display 250. In an example case in which the user wears the wearable device 101, ambient light may be transmitted to the user by being incident on the first surface 231 and being penetrated through the second surface 232. For another example, the at least one display 250 may display an augmented reality image in which a virtual reality image provided by the at least one optical device 282 and 284 is combined with a reality screen transmitted through ambient light, on a display area formed on the second surface 232.

In an embodiment, the at least one display 250 may include at least one waveguide 233 and 234 that transmits light transmitted from the at least one optical device 282 and 284 by diffracting to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a polygonal or curved shape. Light incident to an end of the at least one waveguide 233 and 234 may be propagated to another end of the at least one waveguide 233 and 234 by the nano pattern. The at least one waveguide 233 and 234 may include at least one of at least one diffraction element (e.g., a diffractive optical element (DOE), a holographic optical element (HOE)), and a reflection element (e.g., a reflection mirror). For example, the at least one waveguide 233 and 234 may be provided in the wearable device 101 to guide a screen displayed by the at least one display 250 to the user's eyes. For example, the screen may be transmitted to the user's eyes based on total internal reflection (TIR) generated in the at least one waveguide 233 and 234.

The wearable device 101 may analyze an object included in a real image collected through a photographing camera 260-4, combine with a virtual object corresponding to an object that become a subject of augmented reality provision among the analyzed object, and display on the at least one display 250. The virtual object may include at least one of text and images for various information associated with the object included in the real image. The wearable device 101 may analyze the object based on a multi-camera such as a stereo camera. For the object analysis, the wearable device 101 may execute space recognition (e.g., simultaneous localization and mapping (SLAM)) using the multi-camera and/or time-of-flight (ToF). The user wearing the wearable device 101 may watch an image displayed on the at least one display 250.

According to an embodiment, a frame 200 may be configured with a physical structure in which the wearable device 101 may be worn on the user's body. According to an embodiment, the frame 200 may be configured so that, in an example case in which the user wears the wearable device 101, the first display 250-1 and the second display 250-2 may be positioned corresponding to the user's left and right eyes. The frame 200 may support the at least one display 250. For example, the frame 200 may support the first display 250-1 and the second display 250-2 to be positioned at positions corresponding to the user's left and right eyes.

Referring to FIG. 2A, according to an embodiment, the frame 200 may include an area 220 at least partially in contact with the portion of the user's body in case that the user wears the wearable device 101. For example, the area 220 of the frame 200 in contact with the portion of the user's body may include an area in contact with a portion of the user's nose, a portion of the user's ear, and a portion of the side of the user's face that the wearable device 101 contacts. According to an embodiment, the frame 200 may include a nose pad 210 that is contacted on the portion of the user's body. In an example case in which the wearable device 101 is worn by the user, the nose pad 210 may be contacted on the portion of the user's nose. The frame 200 may include a first temple 204 and a second temple 205, which are contacted on another portion of the user's body that is distinct from the portion of the user's body.

For example, the frame 200 may include a first rim 201 surrounding at least a portion of the first display 250-1, a second rim 202 surrounding at least a portion of the second display 250-2, a bridge 203 provided between the first rim 201 and the second rim 202, a first pad 211 provided along a portion of the edge of the first rim 201 from one end of the bridge 203, a second pad 212 provided along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 provided between the first rim 201 and the first temple 204. The second temple 205 may be rotatably connected with respect to the second rim 202 through the second hinge unit 207 provided between the second rim 202 and the second temple 205. According to an embodiment, the wearable device 101 may identify an external object (e.g., a user's fingertip) touching the frame 200 and/or a gesture performed by the external object by using a touch sensor, a grip sensor, and/or a proximity sensor formed on at least a portion of the surface of the frame 200.

According to an embodiment, the wearable device 101 may include hardware (e.g., hardware described above based on the block diagram of FIG. 2) that performs various functions. For example, the hardware may include a battery module 270, an antenna module 275, the at least one optical device 282 and 284, speakers (e.g., speakers 255-1 and 255-2), a microphone (e.g., microphones 265-1, 265-2, and 265-3), a light emitting module, and/or a printed circuit board (PCB) 290 (e.g., printed circuit board). Various hardware may be provided in the frame 200.

According to an embodiment, the microphone (e.g., the microphones 265-1, 265-2, and 265-3) of the wearable device 101 may obtain a sound signal, by being provided on at least a portion of the frame 200. The first microphone 265-1 provided on the bridge 203, the second microphone 265-2 provided on the second rim 202, and the third microphone 265-3 provided on the first rim 201 are illustrated in FIG. 2B, but the number and disposition of the microphone 265 are not limited to an embodiment of FIG. 2B. In case that the number of the microphone 265 included in the wearable device 101 is two or more, the wearable device 101 may identify a direction of the sound signal by using a plurality of microphones provided on different portions of the frame 200.

According to an embodiment, the at least one optical device 282 and 284 may project a virtual object on the at least one display 250 in order to provide various image information to the user. For example, the at least one optical device 282 and 284 may be a projector. The at least one optical device 282 and 284 may be provided adjacent to the at least one display 250 or may be included in the at least one display 250 as a portion of the at least one display 250. According to an embodiment, the wearable device 101 may include a first optical device 282 corresponding to the first display 250-1, and a second optical device 284 corresponding to the second display 250-2. For example, the at least one optical device 282 and 284 may include the first optical device 282 provided at a periphery of the first display 250-1 and the second optical device 284 provided at a periphery of the second display 250-2. The first optical device 282 may transmit light to the first waveguide 233 provided on the first display 250-1, and the second optical device 284 may transmit light to the second waveguide 234 provided on the second display 250-2.

In an embodiment, a camera 260 may include the photographing camera 260-4, an eye tracking camera (ET CAM) 260-1, and/or the motion recognition camera 260-2 and 260-3. The photographing camera 260-4, the eye tracking camera 260-1, and the motion recognition camera 260-2 and 260-3 may be provided at different positions on the frame 200 and may perform different functions. The eye tracking camera 260-1 may output data indicating a position of eye or a gaze of the user wearing the wearable device 101. For example, the wearable device 101 may detect the gaze from an image including the user's pupil obtained through the eye tracking camera 260-1. The wearable device 101 may identify an object (e.g., a real object, and/or a virtual object) focused by the user, by using the user's gaze obtained through the eye tracking camera 260-1. The wearable device 101 identifying the focused object may execute a function (e.g., gaze interaction) for interaction between the user and the focused object. The wearable device 101 may represent a portion corresponding to eye of an avatar indicating the user in the virtual space, by using the user's gaze obtained through the eye tracking camera 260-1. The wearable device 101 may render an image (or a screen) displayed on the at least one display 250, based on the position of the user's eye. For example, visual quality (e.g., resolution, brightness, saturation, grayscale, and pixels per inch (PPI)) of a first area related to the gaze within the image and visual quality of a second area distinguished from the first area may be different. In this disclosure, the term "resolution" is used to refer to the density of pixels in an image and/or display 250. The density and/or resolution of pixels may be measured based on a unit of PPI and/or dot performance (dpi), or may be parameterized. The wearable device 101 may obtain an image having the visual quality of the first area matching the user's gaze and the visual quality of the second area by using foveated rendering. In an example case in which the wearable device 101 supports an iris recognition function, user authentication may be performed based on iris information obtained using the eye tracking camera 260-1. An example in which the eye tracking camera 260-1 is provided toward the user's right eye is illustrated in FIG. 2B, but the disclosure is not limited thereto, and the eye tracking camera 260-1 may be provided alone toward the user's left eye or may be provided toward two eyes.

In an embodiment, the photographing camera 260-4 may photograph a real image or background to be matched with a virtual image in order to implement the augmented reality or mixed reality content. The photographing camera 260-4 may be used to obtain an image having a high resolution based on a high resolution (HR) or a photo video (PV). The photographing camera 260-4 may photograph an image of a specific object existing at a position viewed by the user and may provide the image to the at least one display 250. The at least one display 250 may display one image in which a virtual image provided through the at least one optical device 282 and 284 is overlapped with information on the real image or background including an image of the specific object obtained by using the photographing camera 260-4. The wearable device 101 may compensate for depth information (e.g., a distance between the wearable device 101 and an external object obtained through a depth sensor), by using an image obtained through the photographing camera 260-4. The wearable device 101 may perform object recognition through an image obtained using the photographing camera 260-4. The wearable device 101 may perform a function (e.g., auto focus) of focusing an object (or subject) within an image and/or an optical image stabilization (OIS) function (e.g., an anti-shaking function) by using the photographing camera 260-4. While displaying a screen representing a virtual space on the at least one display 250, the wearable device 101 may perform a pass through function for displaying an image obtained through the photographing camera 260-4 overlapping at least a portion of the screen. In an embodiment, the photographing camera 260-4 may be provided on the bridge 203 provided between the first rim 201 and the second rim 202.

The eye tracking camera 260-1 may implement a more realistic augmented reality by matching the user's gaze with the visual information provided on the at least one display 250, by tracking the gaze of the user wearing the wearable device 101. In an example case in which the user looks at the front, the wearable device 101 may naturally display environment information associated with the user's front on the at least one display 250 at a position where the user is positioned. The eye tracking camera 260-1 may be configured to capture an image of the user's pupil in order to determine the user's gaze. For example, the eye tracking camera 260-1 may receive gaze detection light reflected from the user's pupil and may track the user's gaze based on the position and movement of the received gaze detection light. In an embodiment, the eye tracking camera 260-1 may be provided at a position corresponding to the user's left and right eyes. For example, the eye tracking camera 260-1 may be provided in the first rim 201 and/or the second rim 202 to face the direction in which the user wearing the wearable device 101 is positioned.

The motion recognition camera 260-2 and 260-3 may provide a specific event to the screen provided on the at least one display 250 by recognizing the movement of the whole or portion of the user's body, such as the user's torso, hand, or face. The motion recognition camera 260-2 and 260-3 may obtain a signal corresponding to motion by recognizing the user's motion (e.g., gesture recognition), and may provide a display corresponding to the signal to the at least one display 250. The processor may identify a signal corresponding to the operation and may perform a preset function based on the identification. The motion recognition camera 260-2 and 260-3 may be used to perform simultaneous localization and mapping (SLAM) for 6 degrees of freedom pose (6 DOF pose) and/or a space recognition function using a depth map. The processor may perform a gesture recognition function and/or an object tracking function, by using the motion recognition camera 260-2 and 260-3. In an embodiment, the motion recognition camera 260-2 and camera 260-3 may be provided on the first rim 201 and/or the second rim 202.

The camera 260 included in the wearable device 101 is not limited to the above-described eye tracking camera 260-1 and the motion recognition camera 260-2 and 260-3. For example, the wearable device 101 may identify an external object included in a field of view (FoV) by using a camera provided toward the user's FoV. The wearable device 101 identifying the external object may be performed based on a sensor for identifying a distance between the wearable device 101 and the external object, such as a depth sensor and/or a time of flight (ToF) sensor. The camera 260 provided toward the FoV may support an autofocus function (AF) and/or an optical image stabilization (OIS) function. For example, in order to obtain an image including a face of the user wearing the wearable device 101, the wearable device 101 may include the camera 260 (e.g., a face tracking (FT) camera) provided toward the face.

According to an embodiment, the wearable device 101 may further include a light source (e.g., LED) that emits light toward a subject (e.g., user's eyes, face, and/or an external object in the FoV) photographed by using the camera 260. The light source may include an LED having an infrared wavelength. The light source may be provided on at least one of the frame 200, and the hinge units 206 and 207.

According to an embodiment, the battery module 270 may supply power to electronic components of the wearable device 101. In an embodiment, the battery module 270 may be provided in the first temple 204 and/or the second temple 205. For example, the battery module 270 may be a plurality of battery modules 270. The plurality of battery modules 270, respectively, may be provided on each of the first temple 204 and the second temple 205. In an embodiment, the battery module 270 may be provided at an end of the first temple 204 and/or the second temple 205.

The antenna module 275 may transmit the signal or power to the outside of the wearable device 101 or may receive the signal or power from the outside. In an embodiment, the antenna module 275 may be provided in the first temple 204 and/or the second temple 205. For example, the antenna module 275 may be provided close to one surface of the first temple 204 and/or the second temple 205.

The speaker 255 may output a sound signal to the outside of the wearable device 101. A sound output module may be referred to as a speaker. In an embodiment, the speaker 255 may be provided in the first temple 204 and/or the second temple 205 in order to be provided adjacent to the ear of the user wearing the wearable device 101. For example, the speaker 255 may include a second speaker 255-2 provided adjacent to the user's left ear by being provided in the first temple 204, and a first speaker 255-1 provided adjacent to the user's right ear by being provided in the second temple 205.

According to an embodiment, the light emitting module may include at least one light emitting element. The light emitting module may emit light of a color corresponding to a specific state or may emit light through an operation corresponding to the specific state in order to visually provide information on a specific state of the wearable device 101 to the user. In an example case in which the wearable device 101 requires charging, it may emit red light at a constant cycle. In an embodiment, the light emitting module may be provided on the first rim 201 and/or the second rim 202.

Referring to FIG. 2B, according to an embodiment, the wearable device 101 may include the printed circuit board (PCB) 290. The PCB 290 may be included in at least one of the first temple 204 or the second temple 205. The PCB 290 may include an interposer provided between at least two sub PCBs. On the PCB 290, one or more hardware (e.g., hardware illustrated by blocks of FIG. 4) included in the wearable device 101 may be provided. The wearable device 101 may include a flexible PCB (FPCB) for interconnecting the hardware.

According to an embodiment, the wearable device 101 may include at least one of a gyro sensor, a gravity sensor, and/or an acceleration sensor for detecting the posture of the wearable device 101 and/or the posture of a body part (e.g., a head) of the user wearing the wearable device 101. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 101 may identify the user's motion and/or gesture performed to execute or stop a specific function of the wearable device 101 based on the IMU.

Figure 3A:
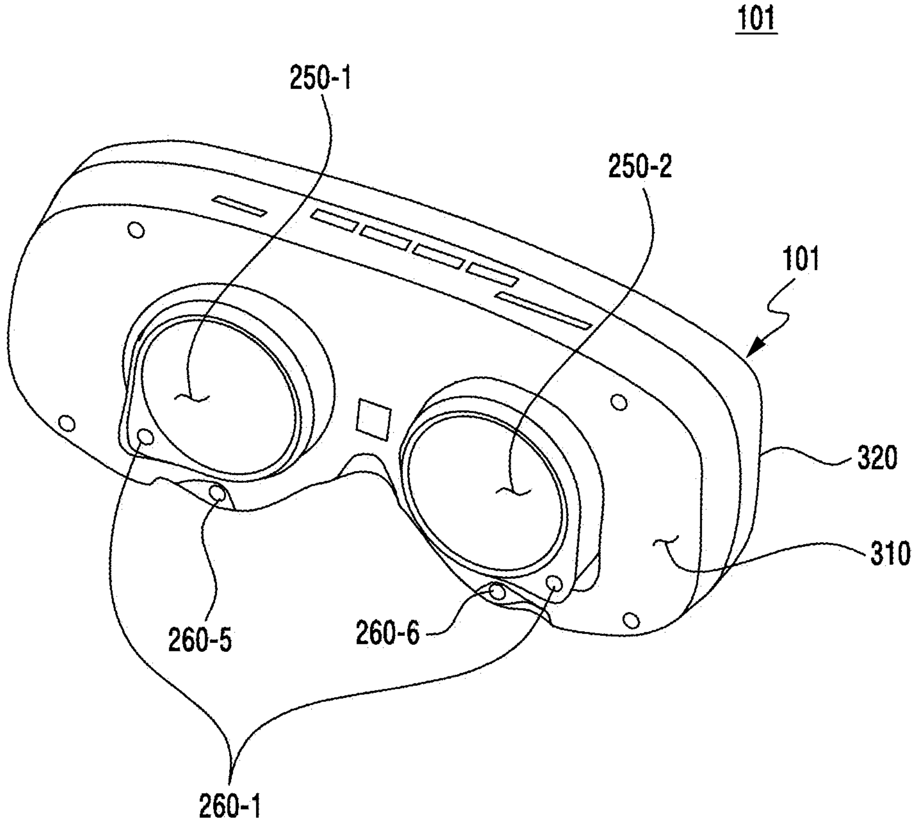
FIGS. 3A and 3B illustrate an example of an exterior of a wearable device.
Figure 3B:
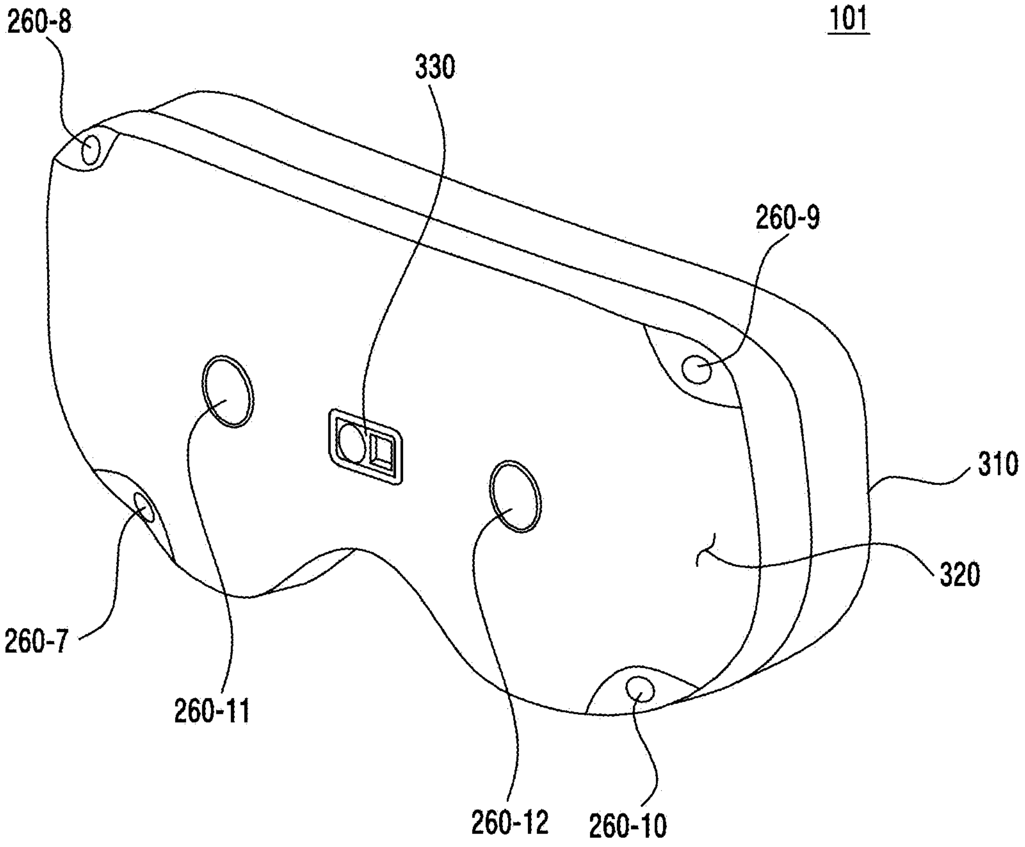

FIGS. 3A and 3B illustrate an example of an exterior of a wearable device (e.g., the wearable device 101). The wearable device 101 of FIGS. 3A and 3B may be an example of the electronic device 101 of FIG. 1, the wearable device 101 of FIGS. 2A and 2B. According to an embodiment, an example of an exterior of a first surface 310 of a housing of the wearable device 101 may be illustrated in FIG. 3A, and an example of an exterior of a second surface 320 opposite to a first surface 310 may be illustrated in FIG. 3B.

Referring to FIG. 3A, according to an embodiment, the first surface 310 of the wearable device 101 may have an attachable shape on the user's body part (e.g., the user's face). According to an embodiment, the wearable device 101 may further include a strap for being fixed on the user's body part, and/or one or more temples (e.g., the first temple 204 and/or the second temple 205 of FIGS. 2A to 2B). A first display 250-1 for outputting an image to the left eye among the user's two eyes and a second display 250-2 for outputting an image to the right eye among the user's two eyes may be provided on the first surface 310. The wearable device 101 may further include rubber or silicon packing, which are formed on the first surface 310, for preventing interference by light (e.g., ambient light) different from the light emitted from the first display 250-1 and the second display 250-2.

According to an embodiment, the wearable device 101 may include cameras 260-1 for photographing and/or tracking two eyes of the user adjacent to each of the first display 250-1 and the second display 250-2. The cameras 260-1 may be referred to as the gaze tracking camera 260-1 of FIG. 2B. According to an embodiment, the wearable device 101 may include cameras 260-5 and 260-6 for photographing and/or recognizing the user's face. The cameras 260-5 and 260-6 may be referred to as a FT camera. The wearable device 101 may control an avatar representing a user in a virtual space, based on a motion of the user's face identified using the cameras 260-5 and 260-6. For example, the wearable device 101 may change a texture and/or a shape of a portion (e.g., a portion of an avatar representing a human face) of the avatar, by using information obtained by the cameras 260-5 and 260-6 (e.g., the FT camera) and representing the facial expression of the user wearing the wearable device 101.

Referring to FIG. 3B, a camera (e.g., cameras 260-7, 260-8, 260-9, 260-10, 260-11, and 260-12), and/or a sensor (e.g., the depth sensor 330) for obtaining information associated with the external environment of the wearable device 101 may be provided on the second surface 320 opposite to the first surface 310 of FIG. 3A. For example, the cameras 260-7, 260-8, 260-9, and 260-10 may be provided on the second surface 320 in order to recognize an external object. The cameras 260-7, 260-8, 260-9, and 260-10 may be referred to as the motion recognition cameras 260-2 and 260-3 of FIG. 2B.

By using cameras 260-11 and 260-12, the wearable device 101 may obtain an image and/or video to be transmitted to each of the user's two eyes. The camera 260-11 may be provided on the second surface 320 of the wearable device 101 to obtain an image to be displayed through the second display 250-2 corresponding to the right eye among the two eyes. The camera 260-12 may be provided on the second surface 320 of the wearable device 101 to obtain an image to be displayed through the first display 250-1 corresponding to the left eye among the two eyes. The cameras 260-11 and 260-12 may be referred to as the photographing camera 260-4 of FIG. 2B.

According to an embodiment, the wearable device 101 may include the depth sensor 330 provided on the second surface 320 in order to identify a distance between the wearable device 101 and the external object. By using the depth sensor 330, the wearable device 101 may obtain spatial information (e.g., a depth map) about at least a portion of the FoV of the user wearing the wearable device 101. not illustrated, a microphone for obtaining sound outputted from the external object may be provided on the second surface 320 of the wearable device 101. The number of microphones may be one or more according to embodiments.

Hereinafter, a hardware or software configuration of the wearable device 101 will be described later with reference to FIG. 4.

Figure 4:
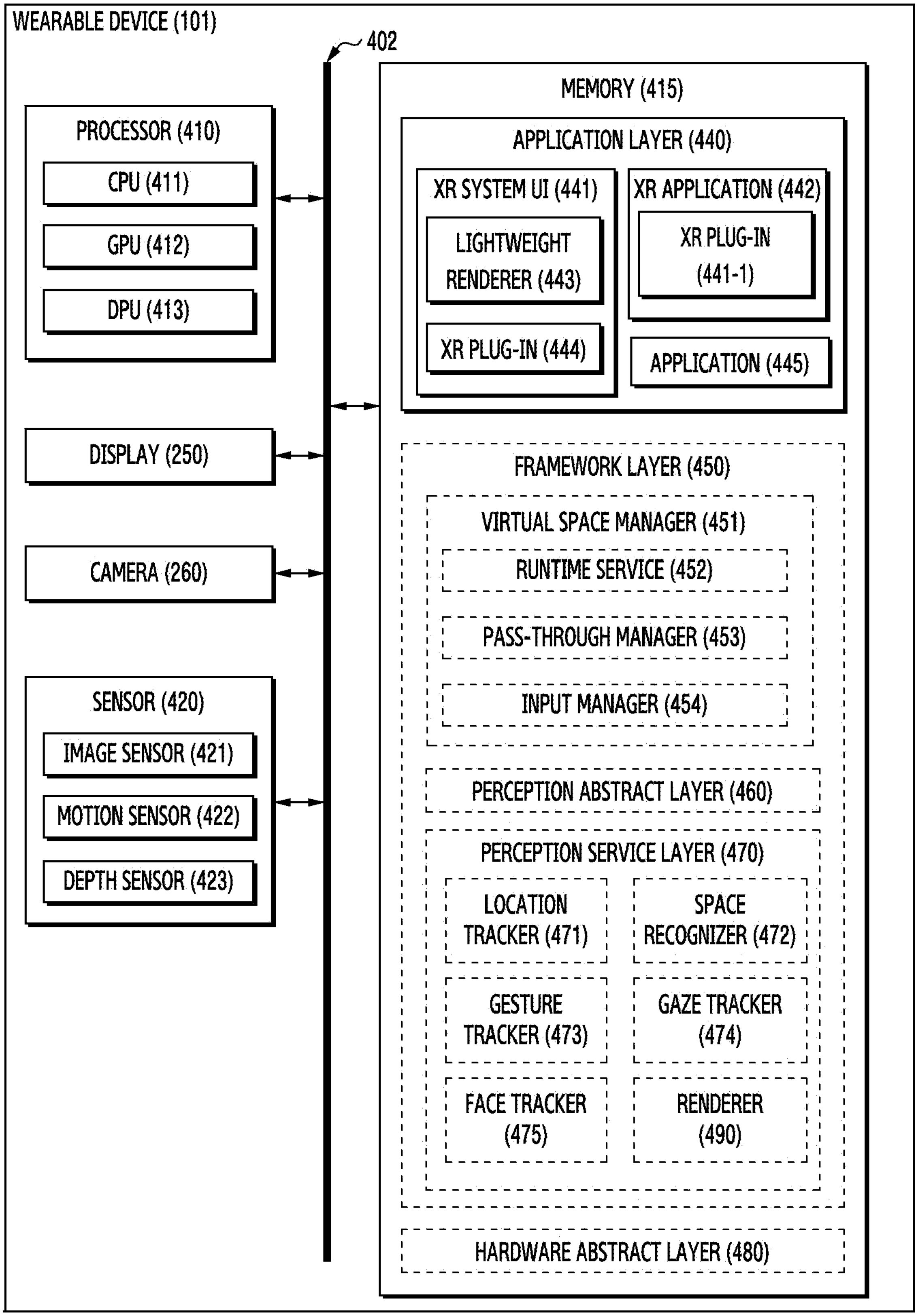
FIG. 4 illustrates an example of a block diagram of a wearable device.

FIG. 4 illustrates an example of a block diagram of a wearable device (e.g., wearable device 101). The wearable device 101 of FIG. 4 may be an example of the electronic device 101 of FIG. 1 and the wearable device 101 of FIGS. 2A to 3B.

Referring to FIG. 4, the wearable device 101 according to an embodiment may include a processor 410, memory 415, a display 250 (e.g., the first display 250-1 and/or the second display 250-2 of FIG. 2A, FIG. 2B, FIG. 3A, and FIG. 3B) and/or a camera 260 (e.g., the eye tracking camera 260-1 of FIGS. 2B and 3A, the motion recognition camera 260-2 and 260-3 of FIG. 2B, and the photographing camera 260-4 of FIG. 2B), and/or a sensor 420. The processor 410, the memory 415, the display 250, the camera 250, and the sensor 420 may be electrically and/or operably connected to each other by an electronic component such as a communication bus 402. In the disclosure, an operational connection of electronic components may include a direct connection established between the electronic components and/or an indirect connection established between the electronic components such that a first electronic component of the electronic components is controlled by a second electronic component of the electronic components. The type and/or number of electronic components included in the wearable device 101 is not limited as illustrated in FIG. 4. For example, the wearable device 101 may include only some of the electronic components illustrated in FIG. 4.

According to an embodiment, the processor 410 of the wearable device 101 may include circuitry (e.g., processing circuitry) for processing data, based on one or more instructions. For example, the circuitry for processing data may include an arithmetic and logic unit (ALU), a field programmable gate array (FPGA), a central processing unit (CPU) and/or an application processor (AP). In an embodiment, the wearable device 101 may include one or more processors. According to an embodiment, a structure of the processor 410 is not limited to an embodiment of the disclosure, and at least one circuit may be formed as a separate processor physically separated outside the processor. The processor 410 may have a structure of a multi-core processor such as a dual core, a quad core, a hexa core, and/or an octa core. The multi-core processor structure of the processor 410 may include a structure (e.g., a big-little structure) based on a plurality of core circuits, divided by power consumption, clock, and/or computational amount per unit time. In an embodiment including the processor 410 having a multi-core processor structure, operations and/or functions of the disclosure may be performed individually or collectively by one or more cores included in the processor 410.

According to an embodiment, the memory 415 of the wearable device 101 may include an electronic component for storing data and/or instructions inputted to the processor 410 and/or outputted from the processor 410. For example, the memory 415 may include a volatile memory such as a random-access memory (RAM) and/or a non-volatile memory such as a read-only memory (ROM). For example, the volatile memory may include at least one of a dynamic RAM (DRAM), a static RAM (SRAM), a cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disc, and an embedded multi-media card (eMMC). In an embodiment, the memory 415 may be referred to as a storage.

In an embodiment, the display 250 of the wearable device 101 may output visualized information to a user of the wearable device 101. The display 250 arranged in front of eyes of the user wearing the wearable device 101 may be provided in at least a portion of a housing of the wearable device 101 (e.g., the first display 250-1 and/or the second display 250-2 of FIGS. 2A, 2B, and 3A). For example, the display 250 may be included in the display assembly. For example, the display 250 may output visualized information to the user by being controlled by the processor 410 including a circuit such as a CPU 411, a graphic processing unit (GPU) 412, and/or a display processing unit (DPU) 413. The display 250 may include a flexible display, a flat panel display (FPD) and/or electronic paper. The display 250 may include a liquid crystal display (LCD), a plasma display panel (PDP), and/or one or more light emitting diode (LED). The LED may include an organic LED (OLED). The disclosure is not limited thereto, and for example, the display 250 may include a projector (or projection assembly) for projecting light onto the lens when the wearable device 101 includes a lens for transmitting external light (or ambient light). In an embodiment, the display 250 may be referred to as a display panel and/or a display module. In an example case in which the wearable device 101 is worn by the user, pixels included in the display 250 may be provided toward any one of the two eyes of the user. For example, the display 250 may include display areas (or active areas) corresponding to each of the user's two eyes.

In an embodiment, the camera 260 of the wearable device 101 may be controlled by the processor 410 to obtain an image (or video). The camera 260 of the wearable device 101 may include the eye tracking camera 260-1 of FIGS. 2B and 3A, the motion recognition cameras 260-2 and 260-3 of FIG. 2B, and the photographing camera 260-4 of FIG. 2B. The wearable device 101 may obtain images including an external object (e.g., user's hand, body, head, face, and eye) using the camera 260. The wearable device 101 may obtain motion data of an external object by using at least a portion of the images obtained using the camera 260. The camera 260 of the wearable device 101 may recognize a user's motion (e.g., gesture, gaze) to obtain a signal (e.g., gesture input, gaze input) corresponding to the motion.

In an embodiment, the sensor 420 of the wearable device 101 may generate electronic information capable of being processed by the processor 410 and/or the memory 415 from non-electronic information associated with the wearable device 101. For example, the sensor 420 may include a global positioning system (GPS) sensor for detecting a geographic location of the wearable device 101. In addition to the GPS method, the sensor 420 may generate information indicating a geographical location of the wearable device 101 based on a global navigation satellite system (GNSS), such as Galileo, Beidou, or Compass). The information may be stored in the memory 415, processed by the processor 410, and/or transmitted to another electronic device distinct from the wearable device 101 via a communication circuit.

Referring to FIG. 4, the sensor 420 may include, but is not limited to, an image sensor 421, a motion sensor 422, and/or a depth sensor 423 (e.g., depth sensor 330 of FIG. 3B). The sensor 420 may include one or more optical sensors (e.g., a charged coupled device (CCD) sensor and a complementary metal oxide semiconductor (CMOS) sensor) that generate an electrical signal indicating a color and/or brightness of light. The image sensor 421 may be referred to as a camera. The plurality of optical sensors included in the image sensor 421 may be provided in a form of a 2-dimensional array. The image sensor 421 may substantially simultaneously obtain electrical signals of each of the plurality of optical sensors to generate 2-dimensional frame data corresponding to light reaching optical sensors of the 2-dimensional array. For example, photographic data captured using the image sensor 421 may mean a 2-dimensional frame data obtained from the image sensor 421. For example, video data captured using the image sensor 421 may mean a sequence of the plurality of 2-dimensional frame data obtained from the image sensor 421 according to a frame rate. The image sensor 421 may further include a flash light, provided toward a direction in which the image sensor 421 receives light and outputting light toward the direction.

According to an embodiment, the wearable device 101 may include a plurality of image sensors provided in different locations and/or facing different directions, as an example of the image sensor 421. As described above with reference to FIGS. 2A, 2B, 3A, and 3B, the plurality of image sensors may include a gaze tracking camera (e.g., the gaze tracking cameras 260-1 of FIGS. 2B and 3A) configured to be arranged toward eyes of a user wearing the wearable device 101. The plurality of image sensors may include an outward camera. The processor 410 may identify a direction of the user's gaze by using an image and/or a video obtained from the gaze tracking camera. The gaze tracking camera may include an infrared (IR) sensor. The gaze tracking camera may be referred to as an eye sensor and/or an eye tracker.

The outward camera may be provided toward the front of the user wearing the wearable device 101 (e.g., a direction to which two eyes may be directed). The wearable device 101 may include a plurality of outward cameras. However, the disclosure is not limited thereto, and as such, according to another embodiment, the outward camera may be provided toward an external space. The processor 410 may identify an external object by using an image and/or a video obtained from the outward camera. For example, the processor 410 may identify a position, shape, and/or gesture (e.g., hand gesture) of a hand of the user wearing the wearable device 101, based on an image and/or a video obtained from the outward camera. Using an image and/or a video of the external environment, obtained from the outward camera, the processor 410 may recognize or track one or more objects in the external environment.

According to an embodiment, the motion sensor 422 may output an electric signal indicating gravitational acceleration, acceleration, and/or angular velocity of a plurality of axes (e.g., x-axis, y-axis, and z-axis), which are perpendicular to each other and based on an origin designated in the wearable device 101 and/or the motion sensor 422. For example, the processor 410 may repeatedly receive or obtain, from the motion sensor 422, sensor data including accelerations, angular velocities, and/or magnitudes of a magnetic field of the number of the plurality of axes, based on a designated period (e.g., 1 millisecond). In an embodiment, the motion sensor 422 may be referred to as an inertial measurement unit (IMU). Using the motion sensor 422, the processor 410 may detect motion of the wearable device 101 (e.g., motion of the wearable device 101 caused by the user wearing the wearable device 101).

According to an embodiment, the depth sensor 423 may be configured to obtain depth information of an object in an image obtained through the camera 260. The depth sensor 423 may include the eye tracking camera 260-1 of FIG. 3B. For example, the depth sensor 423 may obtain depth information of an object in an image, by using a difference between light emitted by light emitting elements and light received by light receiving elements. For example, the depth sensor 423 may include an indirect time of flight (I-TOF) sensor and/or a direct time of flight (D-TOF) sensor. However, disclosure is not limited thereto, and as such, according to another embodiment, the depth sensor 423 may include a LIDAR. For example, the depth sensor 423 may be operably coupled with the processor 410. The depth sensor 423 may be referred to as an optical distance measurement sensor. The sensor 420 included in the wearable device 101 is not limited to the above description, and may include a grip sensor, a proximity sensor, a heart rate sensor, a fingerprint sensor, and/or an illuminance sensor.

According to an embodiment, one or more instructions (or commands) indicating data to be processed by the processor 410 of the wearable device 101, calculations and/or operations to be performed may be stored in the memory 415 of the wearable device 101. A set of one or more instructions may be referred to as a program, firmware, operating system, process, routine, sub-routine, and/or software application (hereinafter referred to as application). For example, the wearable device 101 and/or the processor 410 may perform at least one of operations of FIGS. 6, 7A, 7B, 7C, 7D, 8A, 8B and 9, when a set of a plurality of instruction distributed in the form of an operating system, firmware, driver, program, and/or software application is executed. Hereinafter, a software application being installed within the wearable device 101 may mean that one or more instructions provided in the form of a software application (or package) are stored in the memory 415, and that the one or more applications are stored in an executable format (e.g., a file with an extension designated by the operating system of the wearable device 101) by the processor 410. As an example, the application may include a program and/or a library, associated with a service provided to a user.

Referring to FIG. 4, programs installed in the wearable device 101 may be included in any one among different layers including an application layer 440, a framework layer 450, and/or a hardware abstraction layer (HAL) S, based on a target. For example, programs (e.g., module or driver) designed to target a hardware (e.g., the display 250, and/or the sensor 420) of the wearable device 101 may be included in the hardware abstraction layer 480 (e.g., android system HAL, and/or extended reality (XR) HAL). In terms of including one or more programs for providing an extended reality (XR) service, the framework layer 450 may be referred to as an XR framework layer. For example, the layers illustrated in FIG. 4, which are logically separated (or for convenience of explanation), may not mean that an address space of the memory 415 is divided by the layers.

According to an embodiment, programs designed to target at least one of the hardware abstraction layer 480 and/or the application layer 440 may be included within framework layer 450. For example, the programs may include, but is not limited to, a location tracker 471, a space recognizer 472, a gesture tracker 473, a gaze tracker 474, a face tracker 475, and/or a renderer 490. According to an embodiment, the programs included in the framework layer 450 may provide an application programming interface (API) capable of being executed (or called) based on other programs. According to an embodiment, the framework layer 450 may further include, but is not limited to, a virtual space manager 451 and perception abstraction layer 460.

According to an embodiment, a program designed to target a user of the wearable device 101 may be included in the application layer 440. For example, the program included in the application layer 440 may include, but is not limited to, an extended reality (XR) system user interface (UI) 441 and/or an XR application 442. For example, programs (e.g., software application) included in the application layer 440 may cause execution of a function supported by programs included in the framework layer 450, by calling the API.

The wearable device 101 may display, on the display 250, one or more visual objects for performing interaction with the user, based on the execution of the XR system UI 441. The visual object may mean an object capable of being positioned within a screen for transmission of information and/or interaction, such as text, image, icon, video, button, check box, radio button, text box, slider and/or table. The visual object may be referred to as a visual guide, a virtual object, a visual element, a UI element, a view object, and/or a view element. The wearable device 101 may provide functions available in a virtual space to the user, based on the execution of the XR system UI 441.

Referring to FIG. 4, the XR system UI 441 may include, but is not limited to, a lightweight renderer 443 and/or an XR plug-in 444. For example, the processor 410 may execute the lightweight renderer 443 and/or the XR plug-in 444 in the framework layer 450, based on the XR system UI 441.

The wearable device 101 may obtain a resource (e.g., API, system process, and/or library) used to define, create, and/or execute a rendering pipeline in which partial changes are allowed, based on the execution of the lightweight renderer 443. The lightweight renderer 443 may be referred to as a lightweight renderer pipeline in terms of defining a rendering pipeline in which partial changes are allowed. The lightweight renderer 443 may include a renderer (e.g., a prebuilt renderer) built before execution of a software application. For example, the wearable device 101 may obtain a resource (e.g., API, system process, and/or library) used to define, create, and/or execute the entire rendering pipeline, based on the execution of the XR plug-in 444. The XR plug-in 444 may be referred to as an open XR native client in terms of defining (or setting) the entire rendering pipeline.

The wearable device 101 may display a screen representing at least a portion of a virtual space on the display 250, based on the execution of the XR application 442. The XR plug-in 441-1 included in the XR application 442 may include instructions supporting a function similar to the XR plug-in 444 of the XR system UI 441. Among descriptions of the XR plug-in 441-1, a description overlapping those of the XR plug-in 444 may be omitted. The wearable device 101 may cause execution of the virtual space manager 451, based on execution of the XR application 442.

For example, the wearable device 101 may display an image in a virtual space on the display 250, based on execution of an application 445. The application 445 may be configured to output image information for displaying a two-dimensional image. The wearable device 101 may cause execution of the virtual space manager 451, based on execution of the application 445. The wearable device 101 may create double image information to represent the two-dimensional image in a three-dimensional virtual space, based on the execution of the application 445. For example, the double image information may include first image information for the left eye and second image information for the right eye, in consideration of binocular disparity. In order to represent the two-dimensional image in the three-dimensional virtual space, the wearable device 101 may create the double image information, based on image information for displaying the two-dimensional image.

According to an embodiment, the wearable device 101 may provide a virtual space service, based on the execution of the virtual space manager 451. For example, the virtual space manager 451 may include a platform for supporting a virtual space service. Based on the execution of the virtual space manager 451, the wearable device 101 may identify a virtual space formed based on a user's location indicated by data obtained through the sensor 420, and may display at least a portion of the virtual space on the display 250. The virtual space manager 451 may be referred to as a composition presentation manager (CPM).

The virtual space manager 451 may include, but is not limited to, a runtime service 452, a pass-through manager 453, and an input manager 454. As an example, the runtime service 452 may be referred to as an OpenXR runtime module (or OpenXR runtime program). The wearable device 101 may execute at least one of a user's pose prediction function, a frame timing function, and/or a space input function, based on the execution of the runtime service 452. As an example, the wearable device 101 may perform rendering for a virtual space service to a user, based on the execution of the runtime service 452. For example, based on the execution of runtime service 452, a function associated with a virtual space executable by the application layer 440 may be supported.

According to an embodiment, based on the execution of the pass-through manager 453, the wearable device 101 may display an image and/or a video representing an actual space obtained through an external camera superimposed on at least a portion of the screen, while displaying a screen representing a virtual space on display 250.

According to an embodiment, based on the execution of the input manager 454, the wearable device 101 may identify data (e.g., sensor data) obtained by executing one or more programs included in a perception service layer 470. The wearable device 101 may identify a user input associated with the wearable device 101, by using the obtained data. The user input may be associated with the user's motion (e.g., hand gesture), gaze, and/or speech identified by the sensor 420 (e.g., the image sensor 421 such as an external camera). The user input may be identified based on an external electronic device connected (or paired) through a communication circuit.

According to an embodiment, the perception abstract layer 460 may be used for data exchange between the virtual space manager 451 and the perception service layer 470. In terms of being used for data exchange between the virtual space manager 451 and the perception service layer 470, the perception abstract layer 460 may be referred to as an interface. As an example, the perception abstraction layer 460 may be referred to as OpenPX. The perception abstraction layer 460 may be used for a perception client and a perception service.

According to an embodiment, the perception service layer 470 may include one or more programs for processing data obtained from the sensor 420. One or more programs may include at least one of the location tracker 471, the space recognizer 472, the gesture tracker 473, the gaze tracker 474, and/or the face tracker 475, and/or the renderer 490. The type and/or number of one or more programs included in the perception service layer 470 is not limited as illustrated in FIG. 4.

The wearable device 101 may identify a posture of the wearable device 101 by using the sensor 420, based on the execution of the location tracker 471. The wearable device 101 may identify 6 degrees of freedom pose (6 DOF pose) of the wearable device 101, based on the execution of the location tracker 471, by using data obtained using an external camera (e.g., the image sensor 421) and/or an IMU (e.g., motion sensor 422 including gyro sensor, acceleration sensor and/or geomagnetic sensor). The location tracker 471 may be referred to as a head tracking (HeT) module (or a head tracker or head tracking program).

The wearable device 101 may obtain information for providing a three-dimensional virtual space corresponding to a surrounding environment (e.g., external space) of the wearable device 101 (or a user of the wearable device 101), based on the execution of the space recognizer 472. The wearable device 101 may reproduce the surrounding environment of the wearable device 101 in three dimensions, by using data obtained using an external camera (e.g., the image sensor 421) based on the execution of the space recognizer 472. The wearable device 101 may identify at least one of a plane, an inclination, and a step, based on the surrounding environment of the wearable device 101 reproduced in three dimensions based on the execution of the space recognizer 472. The space recognizer 472 may be referred to as a scene understanding (SU) module (or a scene recognition program).

For example, the wearable device 101 may identify (or recognize) a hand's pose and/or gesture of the user of the wearable device 101 based on the execution of the gesture tracker 473. For example, the wearable device 101 may identify a pose and/or a gesture of the user's hand by using data obtained from an external camera (e.g., the image sensor 421), based on the execution of the gesture tracker 473. As an example, the wearable device 101 may identify a pose and/or a gesture of the user's hand, based on data (or image) obtained using an external camera based on the execution of the gesture tracker 473. The gesture tracker 473 may be referred to as a hand tracking (HaT) module (or a hand tracking program) and/or a gesture tracking module.

For example, the wearable device 101 may identify (or track) the movement of the user's eyes of the wearable device 101, based on the execution of the gaze tracker 474. For example, the wearable device 101 may identify the movement of the user's eyes, by using data obtained from a gaze tracking camera (e.g., the image sensor 421) based on the execution of the gaze tracker 474. The gaze tracker 474 may be referred to as an eye tracking (ET) module (or eye tracking program) and/or a gaze tracking module.

The perception service layer 470 of the wearable device 101 may further include the face tracker 475 for tracking the user's face. For example, the wearable device 101 may identify (or track) the movement of the user's face and/or the user's facial expression, based on the execution of the face tracker 475. The wearable device 101 may estimate the user's facial expression, based on the movement of the user's face based on the execution of the face tracker 475. For example, the wearable device 101 may identify the movement of the user's face and/or the user's facial expression, based on data (e.g., image and/or video) obtained using a FT camera (e.g., a camera 260 facing at least a portion of the user's face, and the image sensor 421), based on the execution of the face tracker 475. The face tracker 475 may be referred to as a face tracking (FT) (or a face tracking program) and/or a face tracking module.

Referring to FIG. 4, as an example of the processor 410, a CPU 411, a graphic processing unit (GPU) 412, and/or a display processing unit (DPU) 413 are illustrated. The renderer 490 may include instructions for rendering images in a 3-dimensional virtual space. The processor 410 (e.g., the DPU 413) executing the renderer 490 may obtain at least one image to be displayed at least partially in a display area of the display 250 in a software application (e.g., a software application executed by the CPU 411 and/or the GPU 412). For example, the processor 410 executing the renderer 490 may determine a location of an area to which an application (e.g., XR application 442, application 445) is to be rendered. The processor 410 executing the renderer 490 may create an image of the application to be displayed on the display 250. The renderer 490 may synthesize the images to create a composite image to be displayed on the display 250.

The processor 410 executing the renderer 490 may divide a display area of the display 250 into a foveated portion (or may be referred to as a foveated area) and a peripheral portion (or may be referred to as a remaining area), by using a gaze location calculated using the location tracker 471 and/or the gaze tracker 474. For example, the processor 410 detecting coordinate values of the gaze location may determine a portion of the display area including the coordinate values as a foveated area. The DPU 413 executing the renderer 490 may obtain at least one image, corresponding to each of the foveated area and the remaining area, and having a size smaller than a size of the entire display area of the display 250 or a resolution less than a resolution of the display area.

The processor 410 executing the renderer 490 may obtain or create a composite image to be displayed on the display 250, by synthesizing an image corresponding to the foveated area and an image corresponding to a peripheral portion. For example, the processor 410 may enlarge the image corresponding to the peripheral portion to a size of the entire display area of the display 250, by performing upscaling. The processor 410 may create a composite image to be displayed on the display 250, by combing the image corresponding to the foveated area onto the enlarged image. For example, the processor 410 may mix the enlarged image and the image corresponding to the foveated area, by applying a visual effect such as blur along a boundary line of the image corresponding to the foveated area.

Figure 5:
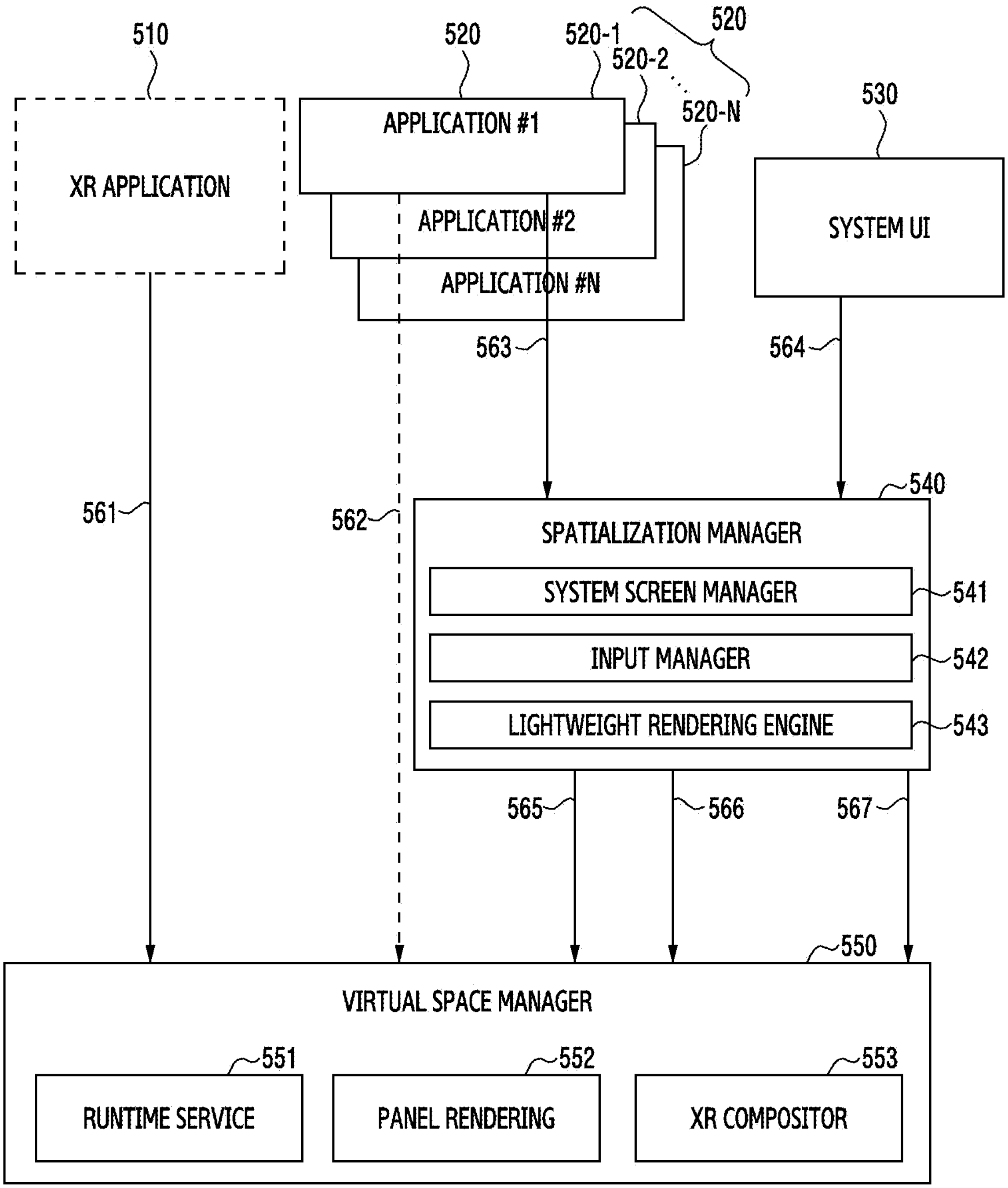
FIG. 5 illustrates an example of a block diagram of an electronic device for displaying an image in a virtual space.

FIG. 5 illustrates an example of a block diagram of an electronic device (e.g., the electronic device 101 of FIG. 1, the wearable device 101 of FIGS. 2A, 2B, 3A, 3B, and 4) for displaying an image in a virtual space. In FIG. 5, an example in which a plurality of programs (or instructions) for displaying an image in a virtual space is executed is described. The plurality of programs (or instructions) may all be executed in one processor (e.g., AP) or may be executed by a plurality of processors (e.g., AP, graphic processing unit (GPU), neural processing unit (NPU)). The meaning of being executable by the plurality of processors may indicate that a portion of programs (or instructions) may be executed by a first processor and another portion of programs (or instructions) may be executed by a second processor different from the first processor.

Referring to FIG. 5, the electronic device 101 may execute a virtual space manager 550 (e.g., the virtual space manager 451 and the CPM of FIG. 4) to render an image in a virtual space. For example, descriptions of the virtual space manager 451 of FIG. 4 may be at least partially referenced for the virtual space manager 550. The virtual space manager 550 may include a platform for supporting a virtual space service. The virtual space manager 550 may include a runtime service 551, a panel rendering 552, and an XR compositor 553. The runtime service 551 may include, but is not limited to, OpenXR Runtime and the panel rendering 552 may include, but is not limited to, 2D Panel Render. The electronic device 101 may execute at least one of a user's pose prediction function, a frame timing function, and/or a space input function, based on the execution of the runtime service 551. For example, descriptions of the runtime service 452 of FIG. 4 may be at least partially referenced with respect to the runtime service 551. The electronic device 101 may display at least one image (video) on a panel (e.g., a 2D panel) to implement a virtual space through the display 250, based on the execution of the panel rendering 552. For example, the electronic device 101 may display a rendering image corresponding to RGB information 566 for a panel from a spatialization manager 540 to be described later via a display (e.g., display 250). The electronic device 101 may synthesize an image of an actual area captured through a camera in a virtual space (hereinafter, a pass-through image) and a virtual area image, based on the execution of the XR compositor 553. For example, the electronic device 101 may create a composite image, by merging the pass-through image and the virtual area image, based on the execution of the XR compositor 553. The electronic device 101 may transmit the created composite image to a display buffer so that the composite image is displayed. The electronic device 101 may identify the virtual space through the virtual space manager 550, and display at least a portion of the virtual space on the display 250. The virtual space manager 550 may be referred to as the CPM. The electronic device 101 may execute the virtual space manager 550 to render an image corresponding to at least a portion of the virtual space.

According to an embodiment, the electronic device 101 may execute the spatialization manager 540. The spatialization manager 540 may perform processes for displaying an image in a three-dimensional virtual space. The electronic device 101 may perform preprocessing based on the execution of the spatialization manager 540 so that an image may be rendered in a three-dimensional virtual space through the virtual space manager 550. For example, the electronic device 101 may perform at least some of functions of the renderer 490 of FIG. 4, based on the execution of the spatialization manager 540. Based on the execution of the spatialization manager 540, the electronic device 101 may process image information provided by an application. The application may include, but is not limited to, the XR application 510, an application 520 providing a normal two-dimensional screen other than XR, and an application providing a system UI 530. The spatialization manager 540 may include a system screen manager 541, an input manager 542, and a lightweight rendering engine 543. The spatialization manager 540 may include, but is not limited to, Space Flinger, the system screen manager 541 may include, but is not limited to, System scene, the input manager 542 may include, but is not limited to, Input Routing, and the lightweight rendering engine 543 may include, but is not limited to, Impress Engine. The system screen manager 541 may be executed to display the system UI 530. System UI-related information 564 may be transmitted from a program (e.g., API) providing the system UI 530 to the system screen manager 541. The system UI-related information 564 may be obtained via a spatializer API and/or a same-process private API. The spatialization manager 540 may determine a layout (e.g., location, display order) of a screen of the system UI 530 in a three-dimensional space, through pre-allocated resources. The system screen manager 541 may transmit image information 567 for rendering a screen of the system UI 530 to the virtual space manager 550, according to the layout. The input manager 542 may be configured to process a user input (e.g., user input on a system screen or an app screen). The input manager 542 may map a user input recognized by the sensor 420 of the electronic device 101 to at least one of one or more software applications (e.g., the XR application 510, an application 520 providing a normal two-dimensional screen other than XR, and an application providing the system UI 530) mapped to the virtual space by the spatialization manager 540. For example, mapping of a user input may include executing instructions (e.g., sub-routine and/or event handler) of a software application for processing the user input. The lightweight rendering engine 543 may be a renderer (e.g., the lightweight renderer 443) for image generation. For example, the lightweight rendering engine 543 may be used to display the system UI 530. According to an embodiment, the spatialization manager 540 may include the lightweight rendering engine 543 for rendering the system UI.

According to an embodiment, in an example case in which the lightweight rendering engine 543 does not have enough resources to render an avatar used in the HMD, at least one external rendering engine may be used. In this case, an external rendering engine support module may be added inside the spatialization manager 540 to solve the compatibility issue with external rendering (e.g., 3rd party engine).

According to an embodiment, the electronic device may execute an application. For example, the virtual space manager 550 may be executed based on (or in response to) the execution of the XR application 510 (e.g., the XR application 442, a 3D game, an XR map, and other immersive applications). The electronic device 101 may provide the virtual space manager 550 with double image information 561 provided from the XR application 510. In order to display an image in a 3D space, the double image information 561 may include two image information considering binocular parallax. For example, in order to render in a 3-dimensional virtual space, the double image information 561 may include first image information for the user's left eye and second image information for the user's right eye. Hereinafter, according to one or more embodiments of the disclosure, double image information is used as a term referring to image information for indicating images for two eyes in a 3-dimensional space. In addition to the double image information, binocular image information, double image data, double image, binocular image data, stereoscopic image information, 3D image information, spatial image information, spatial image data, 2D-3D conversion data, dimensional conversion image data, binocular parallax image data, and/or equivalent technical terms may be used. The electronic device 101 may generate a composite image by merging image layers through the virtual space manager 550. The electronic device 101 may transmit the generated composite image to a display buffer. The composite image may be displayed on the display 250 of the electronic device 101.

According to an embodiment, the electronic device may execute at least one of an application 520 different from the XR application 510. The application 520 may include, but is not limited to, a first application 520-1, a second application 520-2, . . . , and an Nth application 520-N). According to an embodiment, the application 520 may be configured to output image information for displaying a two-dimensional (2D) image (e.g., window and/or activity). In other words, the application 520 may provide a two-dimensional image. As an example, the application 520 may be an image application, a schedule application, or an Internet browser application. In an example case in which the image information 562 provided from the application 520 is provided to the virtual space manager 550 based on (or in response to) the execution of the application 520, since the image information 562 has only the x-coordinate and y-coordinate in the two-dimensional plane, it may be difficult to consider the order of precedence (i.e., a distance separated from the user) between other applications centered on the user. Even in an example case in which displaying the application 520 providing a general 2D screen, the electronic device 101 may execute the spatialization manager 540 to provide double image information to the virtual space manager 550. For example, the electronic device 101 may receive application-related information 563 from the first application 520-1, based on the execution of the spatialization manager 540. For example, the application-related information 563 may include image information indicating a two-dimensional image of the first application 520-1 and/or content information in the first application 520-1. The image information may include, but is not limited to, information including RGB per pixel, and the content information may include, but is not limited to, characteristic of content executed in the first application and type of content executed in the first application. The application-related information 563 may be obtained through a spatializer API. Based on the execution of the spatialization manager 540, the electronic device 101 may identify a location of an area in which the first application 520-1 is to be rendered and information (hereinafter, location information) on a size of the area to be rendered. Based on the execution of the spatialization manager 540, the electronic device 101 may create double image information 565 (e.g., RGBx2) in which the user's binocular disparity is considered, through the image information and the location information. Based on the execution of the spatialization manager 540, the electronic device 101 may provide the double image information 565 to the virtual space manager 550. By converting a simple two-dimensional image into the double image information 565, a problem occurring when the image information 562 is directly transmitted to the virtual space manager 550 may be solved. In addition, as at least some of functions for image display in a virtual space are performed by the spatialization manager 540 instead of the virtual space manager 550, the burden on the virtual space manager 550 may be reduced.

Figure 6:
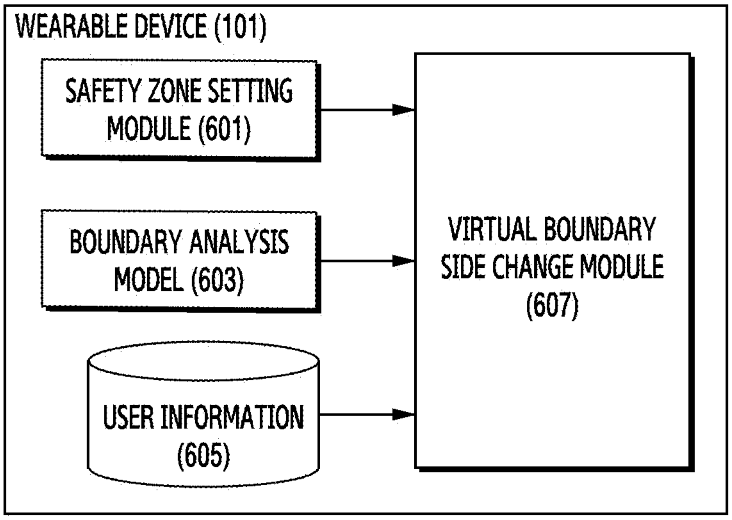
FIG. 6 illustrates an example of components of a wearable device for changing a virtual boundary side.

FIG. 6 illustrates an example of components of the wearable device 101 for changing a virtual boundary side. The wearable device 101 may display a screen representing a virtual space through a display (e.g., the display 250). The virtual space may be referred to as a virtual environment, a simulated space, and/or an immersive environment. A virtual boundary side and a safety zone surrounded by the virtual boundary side may be set for the virtual space. For example, the virtual space may include the virtual boundary side and the safety zone. For example, the virtual space may be defined by the virtual boundary side. As a non-limiting example, the virtual boundary side may be defined by the virtual space. The safety zone may be described as an area set for the safety of a user wearing the wearable device 101. The safety zone may be referred to as a play area, a protection area, a safety area, and/or a guardian area in terms of distinguishing the virtual space for the purpose of protecting the user's safety.

The virtual boundary side may be described as an imaginary surface surrounding the safety zone. The virtual boundary side may be referred to as a fence and/or a wall in terms of a boundary separated from the external environment. The virtual boundary side may be referred to as a virtual boundary, a protective boundary side, a safety boundary side, a protective boundary, and/or a safety boundary, in terms of surrounding the safety zone.

Referring to FIG. 6, the wearable device 101 may include a safety zone setting module 601, a boundary analysis model 603, user information 605, and/or a virtual boundary side change module 607. However, the disclosure is not limited thereto, and as such, the wearable device 101 may include one or more other modules. The safety zone setting module 601, the boundary analysis model 603, and the virtual boundary side change module 607 may change a virtual boundary side through an algorithm (or instructions) stored in memory (e.g., the memory 415). For example, the safety zone setting module 601, the boundary analysis model 603, and the virtual boundary side change module 607 may implement as a hardware, a software, or combination of hardware and software.

The safety zone setting module 601 may be used to set a safety zone in the wearable device 101. The wearable device 101 may provide, to the user, a virtual space in which a virtual boundary side and a safety zone surrounded by the virtual boundary side are set, by using the safety zone setting module 601. The wearable device 101 may display a virtual space in which the safety zone and the virtual boundary side are set, through a display (e.g., the display 250), by using the safety zone setting module 601. For example, the wearable device 101 may display the virtual boundary side. In an example case in which a user is located adjacent to the virtual boundary side, the wearable device 101 may display the virtual boundary side within the virtual space. For example, in a case in which the user approaches the virtual boundary side by a specified distance, the wearable device 101 may display the virtual boundary side within the virtual space. As a non-limiting example, the wearable device 101 may not display the virtual boundary side in the virtual space. For example, in a case in which the user is located further than a specified distance from the virtual boundary side, the wearable device 101 may not display the virtual boundary side in the virtual space. For example, in a case in which the user is located further than a specified distance from the virtual boundary side, the wearable device 101 may refrain from or cease displaying the virtual boundary side in the virtual space.

The wearable device 101 may detect an environment including the user, by using a sensor (e.g., the sensor 420 of FIG. 4) and/or the camera (e.g., the camera 260 of FIG. 4). For example, the wearable device 101 may detect or identify an external object located within a specified distance, through the sensor 420 and/or the camera 260. The external object may include, but is not limited to, a wall, a desk, a bed, and a chair, etc. The wearable device 101 may obtain depth information of the detected external object through a depth sensor (e.g., the depth sensor 423 of FIG. 4). The wearable device 101 may provide, to the safety zone setting module 601, the obtained depth information. The safety zone setting module 601 may be used to set a safety zone that does not overlap the detected external object, based on the obtained depth information.

The virtual boundary side surrounding the safety zone may extend from a plane corresponding to a floor. The virtual boundary side may be set (or formed) in a vertical direction from the plane corresponding to the floor. The wearable device 101 may set a boundary on a plane corresponding to a floor and then extend a virtual boundary side in a vertical direction from the boundary to set the virtual boundary side. For example, the boundary set on the plane corresponding to the floor may include a boundary predetermined by a user (e.g., a boundary of 1×1 m centered on the user). For example, a boundary set on the plane corresponding to the floor may include a boundary set according to a user input. For example, while displaying a screen including the plane corresponding to the floor through the display 250, the wearable device 101 may display a boundary within the screen using a controller controlled by the user. For example, the boundary set on the plane corresponding to the floor may be set so that the wearable device 101 does not contact an external object according to depth information of the external object obtained through the depth sensor 423. For example, the boundary set on the plane corresponding to the floor may be set so that the external object is not located within the boundary according to the depth information of the external object obtained through the depth sensor 423.

The boundary analysis model 603 may be used to determine a change in the virtual boundary side using virtual boundary side contact data collected by the wearable device 101. The boundary analysis model 603 may be a learned artificial intelligence (AI) model. The virtual boundary side contact data may be described as data corresponding to a body of a user wearing the wearable device 101 moving outside a safety zone. The virtual boundary side contact data may include coordinate information of the virtual boundary side in contact with the body of the user wearing the wearable device 101. The virtual boundary side contact data may include images representing the user's body in contact with the virtual boundary side obtained through the camera 260. The wearable device 101 may identify a portion of the virtual boundary side with which the user's body is in contact, based on the virtual boundary side contact data. The wearable device 101 may obtain data indicating whether to change the safety zone based on the virtual boundary side contact data. For example, the wearable device 101 may obtain data indicating whether to change the safety zone, by providing virtual boundary side contact data to the boundary analysis model 603. The data indicating whether to change the safety zone may include data determining the expansion of the safety zone, data determining the reduction of the safety zone, and data determining the maintenance of the safety zone. For example, the wearable device 101 may obtain data determining the reduction of the safety zone when a portion of the virtual boundary side with which the user's body is in contact is adjacent to an external object (e.g., a wall, an external object having a sharp shape). The wearable device 101 may change the virtual boundary side to reduce the safety zone. For example, the wearable device 101 may obtain data determining the expansion of the safety zone, when there is no external object within a specified distance from a portion of the virtual boundary side with which the user's body is in contact. For example, based on a determination that there is no external object within the specified distance from the portion of the virtual boundary side with which the user's body is in contact, the wearable device 101 may obtain data determining the expansion of the safety zone. The wearable device 101 may change the virtual boundary side to expand the safety zone. The wearable device 101 may provide, to the virtual boundary side change module 607, data indicating whether to change the safety zone, by using the boundary analysis model 603.

According to an embodiment, the wearable device 101 may collect or obtain virtual boundary side contact data while being controlled (or played) by the user. The wearable device 101 may collect or obtain virtual boundary side contact data through the sensor 420 and/or the camera 260. The wearable device 101 may obtain coordinate information of the virtual boundary side in contact with the user's body through the sensor 420 and/or the camera 260. The coordinate information of the virtual boundary side in contact with the user's body may include a coordinate of a contact point in a reference coordinate system. For example, the reference coordinate system may be a world coordinate system. The coordinate of the contact point in the world coordinate system may be represented by x-axis coordinate, y-axis coordinate, and z-axis coordinate.

According to an embodiment, the wearable device 101 may identify whether to change an area within the virtual boundary side, based on coordinate information of the virtual boundary side in contact with the user's body. In an example case in which there are N or more contact points within a reference area of a designated size within the virtual boundary side, the wearable device 101 may determine the corresponding area as a target area. For example, the reference area may be a circular area having a radius of 20 cm. However, the disclosure is not limited thereto, and as such, the reference area may include others shapes and/or dimensions. The target area may be referred to as a target pose. The wearable device 101 may obtain images including the target area using the camera 260. The wearable device 101 may obtain data indicating whether to change a virtual boundary side including the target area, by providing, to the boundary analysis model 603, coordinate information of the contact points and images including the target area. N may be referred to as a target area reference constant. N may be inversely proportional to the boundary sensitivity of the wearable device 101. For example, N, which represents boundary sensitivity, may be referenced by the following [Equation 1].

$$N = 10 * (1 - S) + t \quad \text{[Equation 1]}$$

Here, N may be represented as a reference constant of a target area, S may be represented as boundary sensitivity and t may be represented as a natural number between 1 and 10. For example, the boundary sensitivity S may be set by a user in wearable device 101.

The user information 605 may be represented by information related to a user of wearable device 101. The user information 605 may include account information logged in the wearable device 101. For example, the user information 605 may indicate a skill level of the user of the account for a virtual space. The skill level of the user of the account for the virtual space may be set by the user. For example, the user information 605 may indicate whether the account is an account for guest mode. The user information 605 may include information of a user wearing the wearable device 101. For example, the user information 605 may include body information of a user wearing the wearable device 101 and/or posture information of a user wearing the wearable device 101. For example, the user information 605 may include length information from the wearable device 101 to the user's hand obtained through the depth sensor 423. For example, the user information 605 may include arm length information of the user. For example, the wearable device 101 may identify arm length information of the user according to the user's input. For example, the wearable device 101 may obtain arm length information of the user through the depth sensor 423. The user information 605 may include information on the change amount of a virtual boundary side previously set by the user.

The wearable device 101 may change a safety zone and a virtual boundary side, by providing the user information 605 to the virtual boundary side change module 607. The wearable device 101 may determine the amount of change in the safety zone according to the user information 605. In an example case in which the wearable device 101 expands the safety zone, the amount by which the safety zone is expanded may be determined based on the user information 605. For example, in a case in which the wearable device 101 expands the safety zone, the amount by which the safety zone is expanded may be expanded to correspond to arm length information of the user. For example, in a case in which the wearable device 101 expands the safety zone, the amount by which the safety zone is expanded may be expanded to correspond to length information from the wearable device 101 to the user's hand. In an example case in which the wearable device 101 reduces the safety zone, the amount by which the safety zone is reduced may be determined based on the user information 605. For example, the amount by which the safety zone is reduced may be set to be larger as a skill level of a user of an account logged into the wearable device 101 for the virtual space is lower. For example, the amount by which the safety zone is reduced may be set to be larger as a play time of the user wearing the wearable device 101 is shorter. For example, in relation to the amount by which the safety zone is reduced, the amount reduced in a general account may be greater than the amount reduced in an account for a guest mode.

The virtual boundary side change module 607 may be used to change the virtual boundary side and the safety zone. The virtual boundary side change module 607 may be referred to as a boundary correction module. The wearable device 101 may expand or reduce the safety zone using the virtual boundary side change module 607. The wearable device 101 may change the virtual boundary side by using the virtual boundary side change module 607. The virtual boundary side change module 607 may use information on a virtual boundary side extended from a plane corresponding to a floor, the user information 605, and/or data indicating whether to change the virtual boundary side. The operations of the wearable device 101 changing the virtual boundary side using the virtual boundary side changing module 607 will be described and exemplified through FIGS. 7A, 7B, 7C, 7D, 8A, 8B, and 9.

Figure 7A:
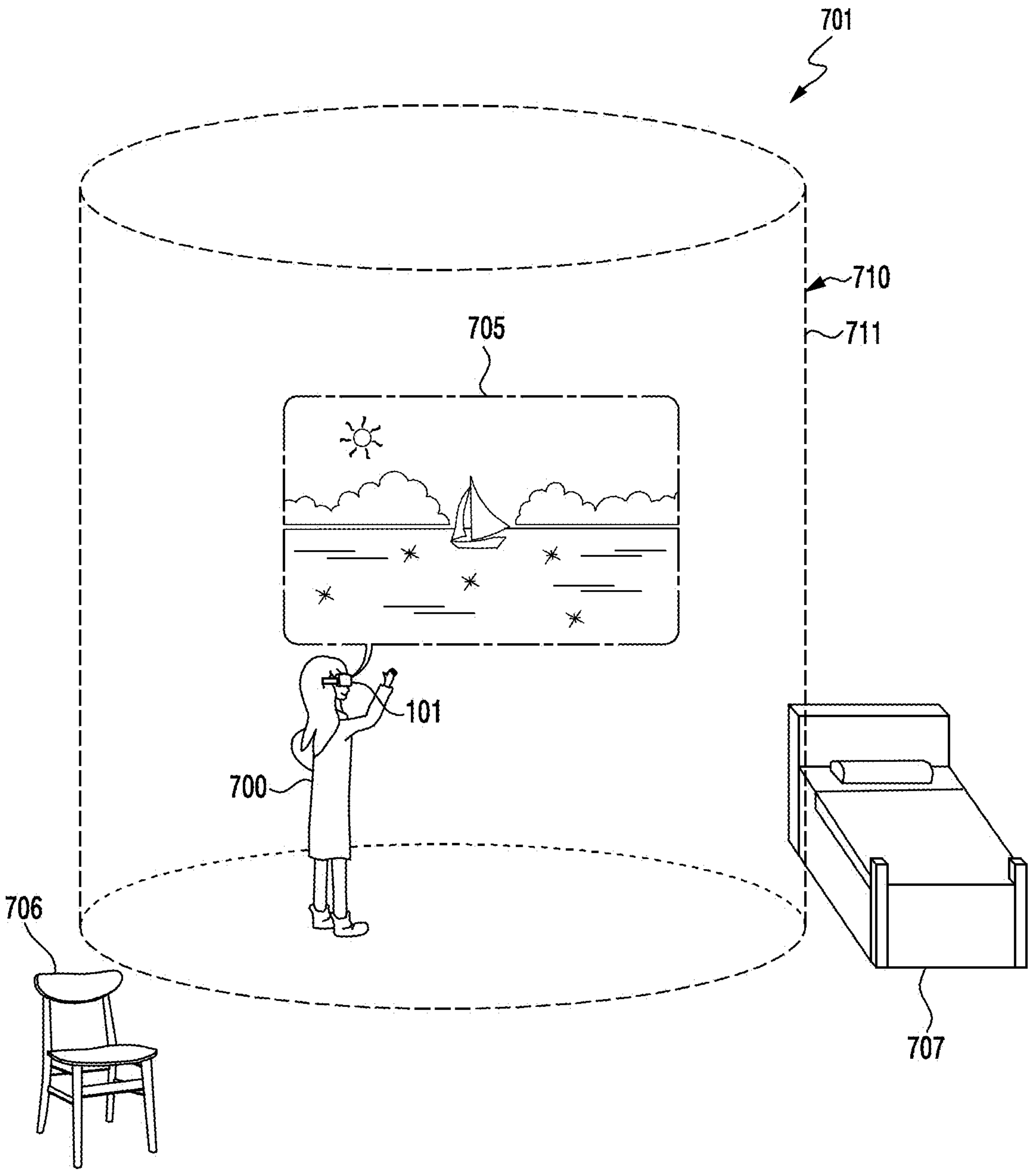
FIG. 7A illustrates an example of a wearable device that provides a virtual space in which a safety zone and a virtual boundary side are set.

FIG. 7A illustrates an example of a wearable device 101 that provides a virtual space in which a safety zone 710 and a virtual boundary side 711 are set.

Referring to FIG. 7A, in an example case 701, the wearable device 101 may be worn by a user 700. The wearable device 101 may display a screen 705 through a display (e.g., the display 250 of FIG. 4). The screen 705 may represent a virtual space. The wearable device 101 may provide an immersive environment to the user 700 by displaying the screen 705. For example, the immersive environment may be described as an environment for providing a function related to augmented reality (AR) and/or mixed reality (MR). For example, the wearable device 101 may provide, to the user 700, a user experience separated (or disconnected) from an external environment, by displaying an immersive environment different from the external environment. The wearable device 101 may provide, to the user 700 wearing the wearable device 101, a user experience separated (or disconnected) from the external environment, by using the screen 705 representing a virtual space completely different from the external environment.

A safety zone 710 and a virtual boundary side 711 may be set in a virtual space. The safety zone 710 may be surrounded by the virtual boundary side 711. The safety zone 710 may be described as an area set for the safety of the user 700 wearing the wearable device 101. The safety zone 710 may be formed in an empty space spaced apart from an external object (e.g., chair 706, bed 707) to prevent collision between the external object and the user 700. The safety zone 710 may be set or defined for a transition between a virtual space and an external (or physical) environment. The wearable device 101 may provide a virtual space among the external environment and the virtual space (or virtual environment) while being located within the safety zone 710. In an example case in which the wearable device 101 is moved from the inside of the safety zone 710 to the outside of the safety zone 710, the wearable device 101 may at least temporarily (or at least partially) cease (or stop) providing the virtual space using the display 250. For example, based on a determination that the wearable device 101 and/or at least a portion of the user 700 is outside of the safety zone 710, the wearable device 101 may at least temporarily (or at least partially) cease (or stop) displaying the virtual space using the display 250.

The virtual space may be defined or provided beyond the safety zone 710. Referring to the screen 705 displayed by the wearable device 101 located inside the safety zone 710, the virtual space may be formed independently of the external environment (and/or the safety zone 710). For example, the virtual space represented through the screen 705 may be represented according to dimensions (e.g., width, length, height, area, and/or volume) different from dimensions of the safety zone 710.

According to an embodiment, the wearable device 101 may perform a function for notifying that the user 700 viewing the screen 705 is adjacent to the virtual boundary side 711, in order to prevent the user 700 from colliding with an external object (e.g., chair 706, bed 707) outside the safety zone 710. For example, the wearable device 101 may display the virtual boundary side 711 within the screen 705, based on a location of the wearable device 101 approaching the virtual boundary side 711 of the safety zone 710. For example, the wearable device 101 may provide, to the user 700, a view of the external environment adjacent to the user 700 together with a view of the virtual space, by displaying images (or videos) being obtained through a camera (e.g., the camera 260). In an example case in which the wearable device 101 identifies a location of the wearable device 101 moving outside the safety zone 710, the wearable device 101 may switch from a mode (e.g., VR mode) providing the virtual space through the entire display area of the display 250 to a pass-through mode.

Figure 7B:
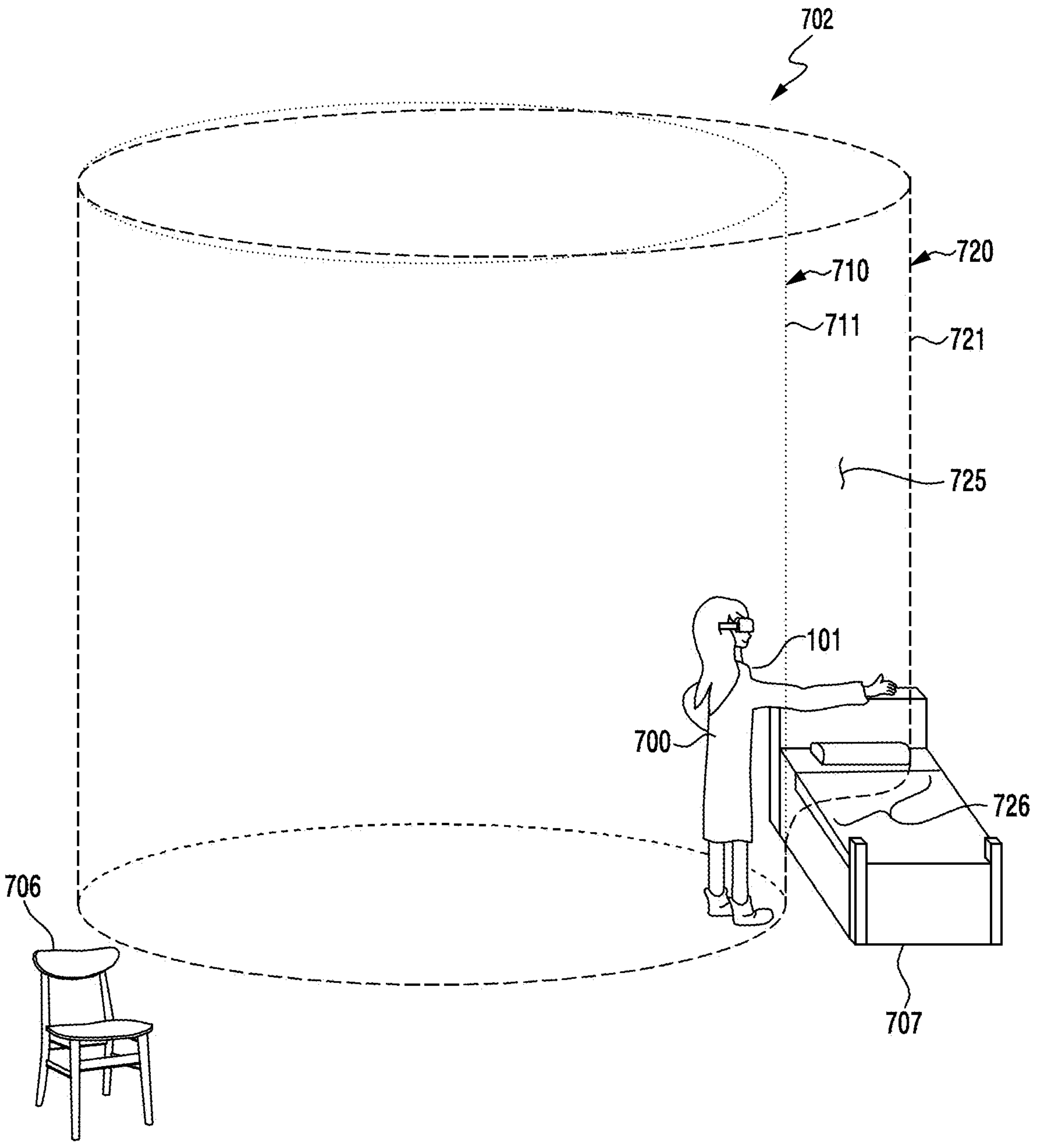
FIG. 7B illustrates an example of a wearable device that changes a virtual boundary side according to an expanded safety zone.

FIG. 7B illustrates an example of a wearable device 101 that changes a virtual boundary side 721 according to an expanded safety zone 720.

Referring to FIG. 7B, in an example case 702, the wearable device 101 may provide, to a user 700, a virtual space in which a safety zone 720, extended from the safety zone 710 of the example case 701 illustrated in FIG. 7A, is set. In the example case 702, the wearable device 101 may change a virtual boundary side from the virtual boundary side 711 of the example case 701 to a virtual boundary side 721, according to the expanded safety zone 720. According to an embodiment, a difference between a volume of the safety zone 710 and a volume of the safety zone 720 may be referred to as the amount by which the safety zone 710 is changed, expanded or increased.

According to an embodiment, the wearable device 101 may receive, from the user 700, a user input to adaptively expand the safety zone 710. The input may be related to motion (e.g., hand gesture), gaze, and/or speech (or utterance) of the user 700 identified by a sensor (e.g., the sensor 420) and/or a camera (e.g., the camera 260). The input may be identified based on an external electronic device (e.g., controller) connected (or paired) via communication circuitry of the wearable device 101. After receiving the user input, the wearable device 101 may identify the hand of the user 700 moving outside the safety zone 710. For example, the wearable device 101 may identify the hand of the user 700 moving outside the safety zone 710, by using hand tracking information on the hand of the user 700 obtained through a sensor (e.g., the sensor 420) and/or the camera 260. For example, the sensor 420 used to obtain the hand tracking information may be the depth sensor 423. The wearable device 101 may identify an external object (e.g., bed 707) located outside the safety zone 710, based on identifying the hand of the user 700 moving outside the safety zone 710. For example, the wearable device 101 may identify an external object by using depth information of the external object obtained through the depth sensor 423. For example, the wearable device 101 may identify an external object by using images including the external object obtained through the camera 260. For example, the wearable device 101 may obtain location information of the external object by using depth information of the external object and/or the images. For example, the location information of the external object may include coordinate information of the external object. For example, the location information of the external object may include information on a space in an external environment occupied by the external object. For example, the location information of the external object may include a distance between the wearable device 101 and the external object.

According to an embodiment, the wearable device 101 may change a safety zone from the safety zone 710 to the safety zone 720, based on location information of an external object (e.g., bed 707) and expansion length information. The wearable device 101 may change the safety zone from the safety zone 710 to the safety zone 720, by using the virtual boundary side change module 607 of FIG. 6. The wearable device 101 may change a virtual boundary side from the virtual boundary side 711 to the virtual boundary side 721, according to the safety zone 720. The safety zone 720 may be represented as the safety zone 710 that is expanded. The expansion length information may be referred to as a parameter determining the amount by which the safety zone is expanded. The expansion length information may be determined according to the user information 605 of FIG. 6. For example, the expansion length information may correspond to a length from the wearable device 101 to the hand of the user 700. For example, the expansion length information may be represented as the sum of the length from the wearable device 101 to the hand of the user 700 and a specified length. For example, the expansion length information may include information on a length of the user's arm. For example, the expansion length information may be set based on a time that the wearable device 101 is used by the user 700. For example, the expansion length information may be set to be larger as the time that the wearable device 101 is used by the user 700 increases. For example, the time that the wearable device 101 is used by the user 700 may be cumulatively stored in the wearable device 101. For example, the expansion length information may be set to be larger as a remaining viewing time of the user 700 is less than a reference value. For example, in a case in which the user is playing a game, the expansion length information may be set to be smaller as a playtime of the user 700 is less. For example, the expansion length information may be set to be smaller as the playtime of the user 700 is less than a reference value. According to an embodiment, the expansion length information may be set to a first expansion value based on the playtime of the user 700 being a first time and the expansion length information may be set to a second expansion value based on the playtime of the user 700 being a second time. Here, the second expansion value may be smaller than the first expansion value based on the second time being shorter than (or less than) the first time. However, the disclosure is not limited thereto, and as such, the expansion length in formation maybe set based on a different criteria.

The wearable device 101 may set a safety zone 720 expanded from the wearable device 101 in correspondence with the expansion length information. For example, the wearable device 101 may set the expanded safety zone 720 according to expansion length information corresponding to a length from the wearable device 101 to the hand of the user 700. For example, the wearable device 101 may set the expanded safety zone 720 according to the expansion length information corresponding to a length from the wearable device 101 to the hand of the user 700. The wearable device 101 may set the safety zone 720 to exclude an area corresponding to location information of the external object. For example, the area corresponding to the location information of the external object may include a space occupied by the external object in an external environment. A shape of the area corresponding to the location information of the external object may correspond to a shape of the external object or may be determined according to the shape of the external object. In an example case in which the shape of the external object is a specific figure (e.g., a rectangular parallelepiped, a cone, a sphere), a shape of the area corresponding to the location information of the external object may also be a specific figure (e.g., a rectangular parallelepiped, a cone, a sphere). For example, when the shape of the external object has a curve, the shape of the area corresponding to the location information of the external object may have a curve.

The wearable device 101 may set the safety zone 720 to be expanded to correspond to expansion length information from the wearable device 101 and to exclude an area corresponding to location information of an external object (e.g., bed 707). The wearable device 101 may set a virtual boundary side 721 surrounding the safety zone 720. Referring to FIG. 7B, the safety zone 720 may include an area higher than the bed 707. For example, the expanded (or extended) portion 725 of the safety zone 720 may include a lower boundary 726, which is higher than the bed 707. The safety zone 720 may exclude an area occupied by the bed 707. The wearable device 101 may expand the safety zone 720 excluding the area occupied by the bed 707, by identifying the bed 707 through the depth sensor 423 and/or the camera 260. The wearable device 101 may increase the degree of freedom while maintaining the safety of the user 700, by adaptively expanding the safety zone 720. Since a movement range of the upper body of the user 700 becomes wider while using the wearable device 101, a user experience of the wearable device 101 may be enhanced.

According to an embodiment, the wearable device 101 may execute operations expanding the safety zone described above, according to output of boundary identification model (e.g., the boundary identification model 603). In the example case 701 of FIG. 7A, the wearable device 101 may identify a hand moving from inside the virtual boundary side 711 to outside the virtual boundary side 711, while the user 700 wears the wearable device 101. The wearable device 101 may obtain an image including the hand through a camera (e.g., the camera 260 of FIG. 4). The wearable device 101 may obtain coordinate information of the hand through a sensor (e.g., the sensor 420 of FIG. 4). The wearable device 101 may obtain data indicating whether to change the safety zone, by providing images including the hand and coordinate information of the hand to the boundary identification model 603. The wearable device 101 may execute operations expanding the safety zone described above, based on data for determining the expansion of the safety zone. The wearable device 101 may expand the safety zone from the safety zone 710 to the safety zone 720, by executing operations for expanding the safety zone described above.

The wearable device 101 may change the virtual boundary side from the virtual boundary side 711 to the virtual boundary side 721 according to the safety zone 720.

Figure 7C:
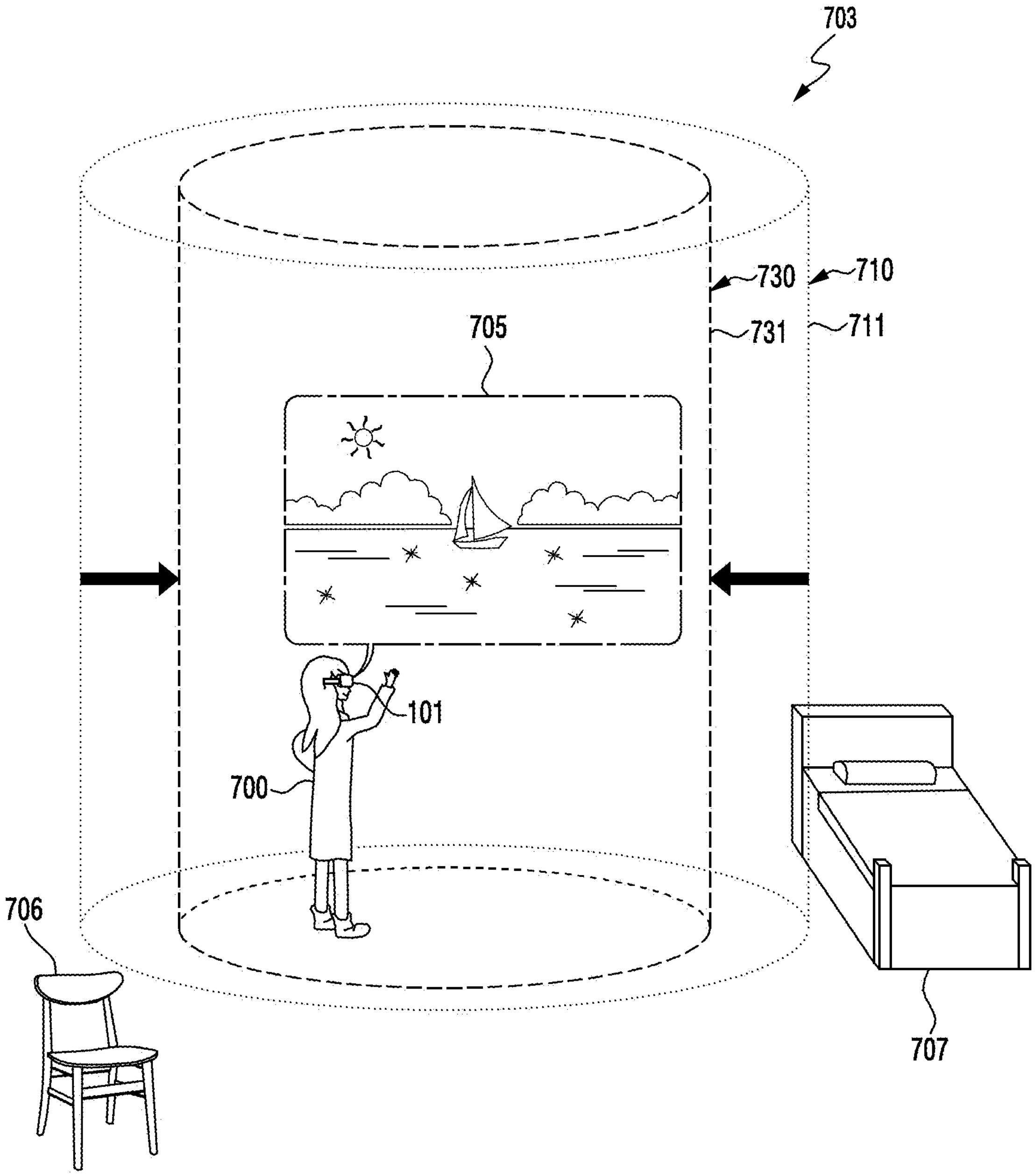
FIGS. 7C and 7D illustrate an example of a wearable device that changes a virtual boundary side according to a reduced safety zone.
Figure 7D:
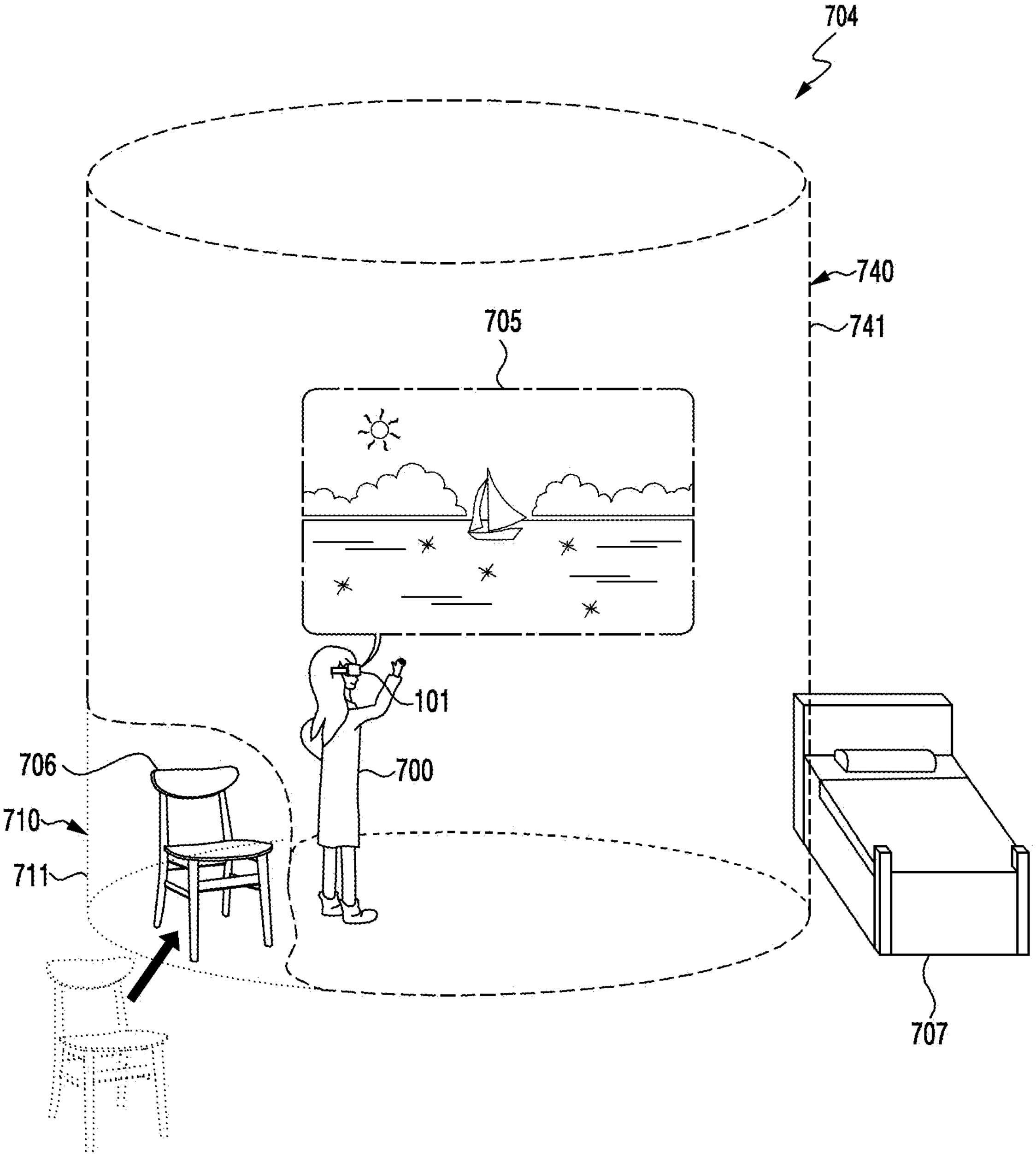

FIGS. 7C and 7D illustrate an example of a wearable device 101 that changes a virtual boundary side according to a reduced safety zone.

Referring to FIG. 7C, in an example case 703, the wearable device 101 may provide, to the user 700, a virtual space in which a safety zone 730, reduced from the safety zone 710 of the example case 701 illustrated in FIG. 7A, is set. In the example case 703, the wearable device 101 may change the virtual boundary side from the virtual boundary side 711 of the example case 701 to the virtual boundary side 731 according to the reduced safety zone 730.

According to an embodiment, the wearable device 101 may receive, from the user 700, a user input to adaptively reduce the safety zone 710. The input may be related to motion (e.g., hand gesture), gaze, and/or speech of the user 700, identified by a sensor (e.g., the sensor 420) and/or a camera (e.g., the camera 260). The input may be identified based on an external electronic device (e.g., controller) connected (or paired) via communication circuitry of the wearable device 101. The wearable device 101 may reduce the safety zone 710, based on the input. The wearable device 101 may reduce the safety zone from the safety zone 710 to the safety zone 730, based on the input. The wearable device 101 may change the virtual boundary side from the virtual boundary side 711 to the virtual boundary side 731 according to the safety zone 730.

According to an embodiment, a difference between a volume of the safety zone 710 and a volume of the safety zone 730 may be referred to as the amount by which the safety zone 730 is reduced. The amount by which the safety zone 730 is reduced may be determined based on user information (e.g., the user information 605). For example, the amount by which the safety zone 730 is reduced may be set to be larger as a skill level of a user of an account logged into the wearable device 101 for the virtual space is lower. For example, the amount by which the safety zone 730 is reduced may be set to be larger as a playtime of a user wearing the wearable device 101 is shorter. For example, the amount by which the safety zone 730 is reduced may be inversely proportional to the playtime the a user wearing the wearable device 101. For example, in relation to the amount by which the safety zone 730 is reduced, the amount reduced in a general account may be greater than the amount reduced in an account for a guest mode. For example, the amount by which the safety zone 730 is reduced may correspond to information on the change amount of the virtual boundary side previously set by the user 700. In an example case in which the change amount of the virtual boundary side previously set by the user 700 becomes larger, the amount by which the safety zone 730 is reduced may be larger.

According to an embodiment, the wearable device 101 may execute operations reducing the safety zone described above, according to the output of boundary identification model (e.g., boundary identification model 603). In the example case 701 of FIG. 7A, the wearable device 101 may identify a hand moving from inside the virtual boundary side 711 to outside the virtual boundary side 711, while the user 700 wears the wearable device 101. The wearable device 101 may obtain an image including the hand through a camera (e.g., the camera 260). The wearable device 101 may obtain coordinate information of the hand through a sensor (e.g., the sensor 420). The wearable device 101 may obtain data indicating whether to change the safety zone, by providing images including the hand and coordinate information of the hand to the boundary identification model 603. The wearable device 101 may execute the operations reducing the safety zone described above, based on data for determining the reduction of the safety zone. The wearable device 101 may expand the safety zone from the safety zone 710 to the safety zone 730, by executing the operations reducing the safety zone described above. The wearable device 101 may change the virtual boundary side from the virtual boundary side 711 to the virtual boundary side 731 according to the safety zone 730.

The wearable device 101 may set the reduced safety zone 730 according to a user input. The wearable device 101 may set a virtual boundary side 731 surrounding the safety zone 730. The wearable device 101 may guide the user 700 to use the wearable device 101 safely, by reducing the safety zone according to the user input. The wearable device 101 may prevent collision between the external object and the user 700 by reducing the safety zone.

Referring to FIG. 7D, in an example case 704, the wearable device 101 may provide, to the user 700, a virtual space in which a safety zone 740, reduced from the safety zone 710 of the example case 701 illustrated in FIG. 7A, is set. In the example case 704, the wearable device 101 may change the virtual boundary side from the virtual boundary side 711 of the example case 701 to the virtual boundary side 741 according to the reduced safety zone 740.

The wearable device 101 may periodically identify an external object (e.g., chair 706, bed 707) within an area within a threshold distance from the wearable device 101, through a sensor (e.g., the sensor 420) and/or a camera (e.g., the camera 260). The wearable device 101 may identify movement information of the external object within the area through the sensor 420 and/or the camera 260. The movement information of the external object may include a speed of the external object and a direction of movement of the external object.

According to an embodiment, the wearable device 101 may identify an external object (e.g., chair 706) moving from outside the virtual boundary side 711 to inside the virtual boundary side 711, through the sensor 420 and/or the camera 260. The wearable device 101 may reduce the safety zone from the safety zone 710 to the safety zone 740, based on identifying the external object moving from outside the virtual boundary side 711 to inside the virtual boundary side 711. The wearable device 101 may change the virtual boundary side from the virtual boundary side 711 to the virtual boundary side 741, according to the safety zone 740. The safety zone 740 may be represented as the safety zone 710 excluding an area corresponding to location information of an external object (e.g., chair 706). Descriptions of the area corresponding to the location information of the external object of FIG. 7B may be referenced for the area corresponding to the location information of the external object. In an example case in which an external object (e.g., chair 706) moves, the wearable device 101 may change the safety zone 740 according to a moving path of the external object.

As a non-limiting example, an external object (e.g., chair 706) may move outside the safety zone 710. The wearable device 101 may identify that the external object moves outside the safety zone 710. Based on identifying that the external object moves outside the safety zone 710, the wearable device 101 may expand the safety zone from the safety zone 740 to the safety zone 710. The wearable device 101 may change the virtual boundary side from the virtual boundary side 741 to the virtual boundary side 711, according to the safety zone 710.

According to an embodiment, the wearable device 101 may adaptively set the safety zone based on a movement of an external object. For example, the wearable device 101 may set the adaptively reduced safety zone 740 by identifying an external object. The wearable device 101 may set the virtual boundary side 741 surrounding the safety zone 740. The wearable device 101 may guide the user 700 to use the wearable device 101 safely by adaptively reducing the safety zone. The wearable device 101 may prevent a collision between the external object and the user 700, by adaptively reducing the safety zone.

Figure 8A:
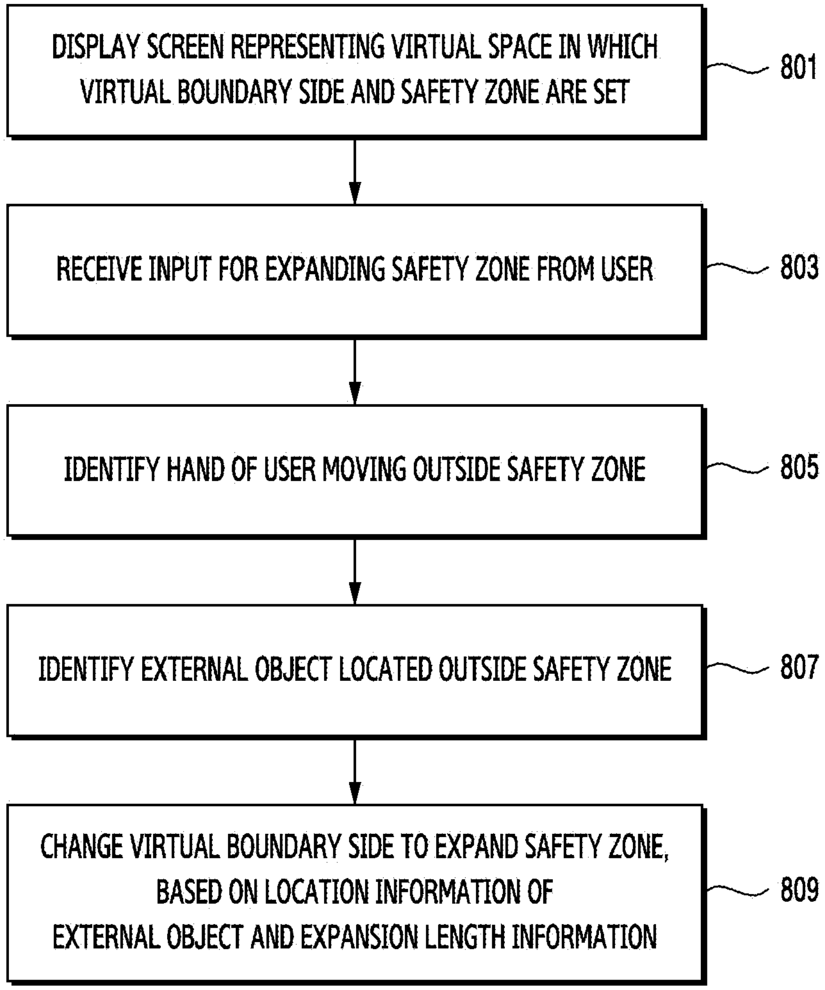
FIG. 8A illustrates an example of operations of a method of a wearable device for changing a virtual boundary side to expand a safety zone.

FIG. 8A illustrates an example of operations of a method of a wearable device (e.g., the wearable device 101) for changing a virtual boundary side to expand a safety zone.

Referring to FIG. 8A, in operation 801, the method may include displaying a screen representing a virtual space including a virtual boundary side (e.g., the virtual boundary side 711) and a safety zone (e.g., the safety zone 710). For example, the wearable device 101 (e.g., the processor 410) may display, on a display (e.g., the display 250), a screen representing a virtual space in which a virtual boundary side 711 and a safety zone 710 surrounded by virtual boundary side 711 are set. The virtual boundary side 711 may be extended from a plane corresponding to a floor. The virtual boundary side 711 may be perpendicular to a plane corresponding to a floor.

In operation 803, the method may include receiving a user input for adaptively changing the safety zone 710. For example, the wearable device 101 (e.g., the processor 410) may receive a user input for adaptively expanding the safety zone 710 from a user (e.g., the user 700) wearing the wearable device 101. The user input may be related to motion (e.g., hand gesture), gaze, and/or speech of the user 700 identified by a sensor (e.g., the sensor 420) and/or a camera (e.g., the camera 260). The user input may be identified based on an external electronic device (e.g., controller) connected (or paired) through communication circuitry of the wearable device 101. For example, the wearable device 101 may be in a state of expanding the safety zone 710, based on receiving the user input.

In operation 805, the method may include identifying a hand of the user 700 moving outside the safety zone 710. For example, after receiving the user input, the wearable device 101 (e.g., the processor 410) may identify a hand of the user 700 moving outside the safety zone 710, based on hand tracking information. The wearable device 101 may identify the hand of the user 700 moving from inside the virtual boundary side 711 to outside the virtual boundary side 711, based on the hand tracking information. The wearable device 101 may obtain the hand tracking information through a sensor (e.g., the sensor 420) and/or a camera (e.g., the camera 260).

In operation 807, the method may include identifying an external object present or located outside the safety zone 710. For example, the wearable device 101 (e.g., the processor 410) may identify an external object (e.g., chair 706, bed 707) located outside the safety zone 710, through a sensor (e.g., the sensor 420) after receiving the user input. The wearable device 101 may obtain depth information of the external object using a depth sensor (e.g., the depth sensor 423). The wearable device 101 may obtain images including the external object through a camera (e.g., the camera 260). The wearable device 101 may obtain location information of the external object by using depth information of the external object and the images. For example, the location information of the external object may include coordinate information of the external object. For example, the location information of the external object may include information on a space in an external environment occupied by the external object. For example, the location information of the external object may include a distance between the wearable device 101 and the external object.

In operation 809, the method may include changing the virtual boundary side 711 and the safety zone 710, based on the location information of the external object. For example, after receiving the user input, the wearable device 101 (e.g., the processor 410) may change the virtual boundary side 711 to expand the safety zone 710, based on location information of an external object (e.g., chair 706, bed 707) and expansion length information. For example, the wearable device 101 may change the virtual boundary side 711 such that the safety zone 710 is expanded. The expansion length information may be determined according to user information (e.g., the user information 605). The expansion length information may correspond to a length from the wearable device 101 to the hand of user 700. The wearable device 101 may set an expanded safety zone (e.g., the safety zone 720) in the virtual space. The wearable device 101 may set a virtual boundary side 721 surrounding the expanded safety zone 720. The expanded safety zone 720 may be expanded from the wearable device 101 to correspond to expansion length information. The expanded safety zone 720 may exclude an area corresponding to location information of the external object.

Figure 8B:
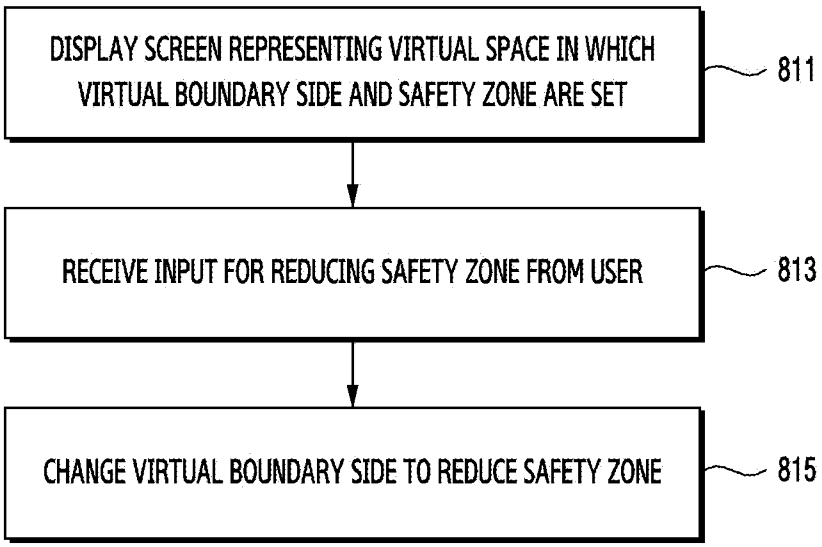
FIG. 8B illustrates an example of operations of a method of a wearable device for changing a virtual boundary side to reduce a safety zone.

FIG. 8B illustrates an example of operations of a method of a wearable device (e.g., the wearable device 101) for changing a virtual boundary side to reduce a safety zone.

Referring to FIG. 8B, in operation 811, the method may include displaying a screen representing a virtual space including a virtual boundary side (e.g., the virtual boundary side 711) and a safety zone (e.g., the safety zone 710). For example, the wearable device 101 (e.g., the processor 410) may display, on a display (e.g., the display 250), a screen representing a virtual space in which a virtual boundary side 711 and a safety zone 710 surrounded by the virtual boundary side 711 are set. The virtual boundary side 711 may extend from a plane corresponding to a floor. The virtual boundary side 711 may be perpendicular to the plane corresponding to the floor. Operation 811 may correspond to operation 801 of FIG. 8A.

In operation 813, the method may include receiving an input for adaptively reducing the safety zone 710. For example, the wearable device 101 (e.g., the processor 410) may receive an input for adaptively reducing the safety zone 710 from a user (e.g., the user 700) wearing the wearable device 101. The input may be related to motion (e.g., hand gesture), gaze, and/or speech of the user 700 identified by a sensor (e.g., the sensor 420) and/or a camera (e.g., the camera 260). The input may be identified based on an external electronic device (e.g., controller) connected (or paired) through communication circuitry of the wearable device 101. The input may be related to movement of an external object identified by the sensor 420 and/or the camera 260. For example, the wearable device 101 may recognize, as the input, identifying of an external object (e.g., chair 706) moving from outside the virtual boundary side 711 to inside the virtual boundary side 711, through the sensor 420 and/or camera 260. For example, the wearable device 101 may reduce the safety zone 710, based on receiving the input.

In operation 815, the method may include changing the virtual boundary side 711 to reduce the safety zone 710 according to user information. For example, the wearable device 101 (e.g., the processor 410) may change the virtual boundary side 711 to reduce the safety zone 710 according to user information (e.g., the user information 605), based on (or in response to) the input. For example, the wearable device 101 may change the virtual boundary side 711 such that the safety zone 710 is reduced. For example, the amount by which the safety zone 730 is reduced may vary according to an account logged in the wearable device 101. For example, the amount by which the safety zone 730 is reduced may be greater as a value indicating a skill level of a user of the account is less. For example, the amount by which the safety zone 730 is reduced may be greater as a time during which the wearable device 101 has been used by the user 700 is shorter. For example, the amount by which the safety zone 730 is reduced may be greater as a playtime of the user 700 is less.

According to an embodiment, the wearable device 101 may change the virtual boundary side 711 to reduce the safety zone 710, based on identifying an external object (e.g., chair 706) moving from outside the virtual boundary side 711 to inside the virtual boundary side 711. For example, the wearable device 101 may set a safety zone (e.g., the safety zone 740) excluding an area corresponding to location information of the external object. For example, the wearable device 101 may identify the external object and obtain location information of the external object, through the sensor 420 and/or the camera 260. The wearable device 101 may set a virtual boundary side 741 surrounding the safety zone 740.

Figure 9:
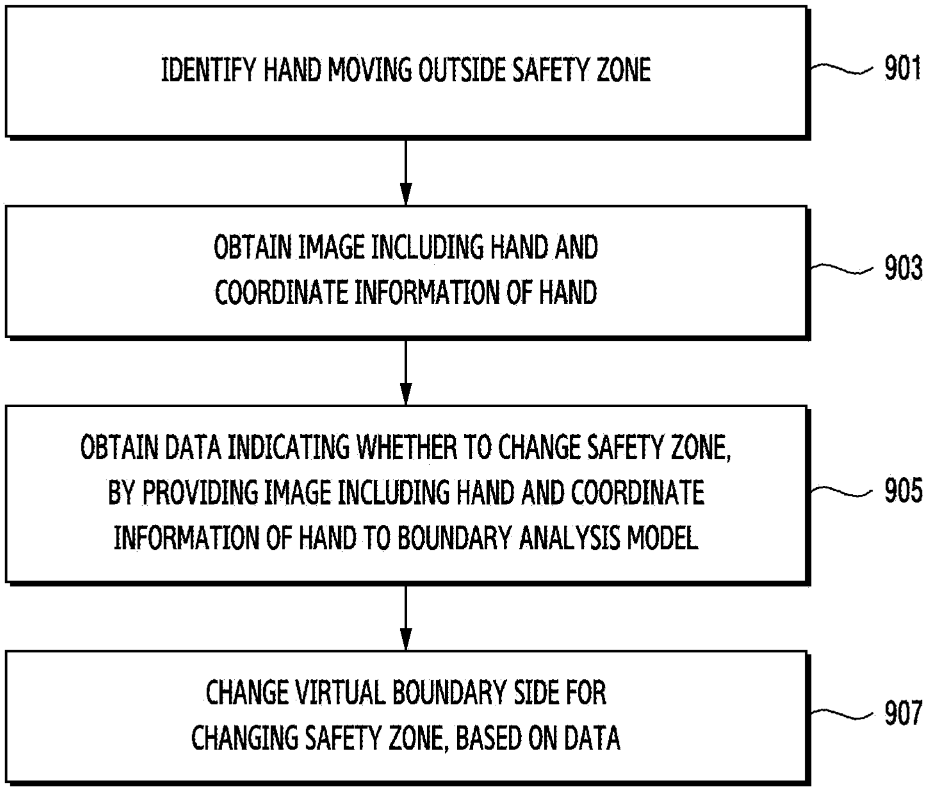
FIG. 9 illustrates an example of operations of a method of a wearable device for changing a virtual boundary side according to output data of a boundary analysis model.

FIG. 9 illustrates an example of operations of a method of a wearable device (e.g., the wearable device 101) for changing a virtual boundary side according to output data of a boundary analysis model.

Referring to FIG. 9, in operation 901, the method may include identifying a hand of a user (e.g., the user 700) moving outside a safety zone (e.g., the safety zone 710). For example, the wearable device 101 (e.g., the processor 410) may identify a hand of a user 700 moving outside a safety zone using hand tracking information. The wearable device 101 may obtain hand tracking information through a sensor (e.g., the sensor 420) and/or a camera (e.g., the camera 260).

In operation 903, the method may include obtaining an image including the hand and coordinate information of the hand. For example, the wearable device 101 (e.g., the processor 410) may obtain an image including the hand and coordinate information of the hand, based on identifying the hand of the user 700 moving outside the safety zone. The wearable device 101 may obtain an image including the hand through a camera (e.g., the camera 260). The wearable device 101 may obtain coordinate information of the hand through a sensor (e.g., the sensor 420).

In operation 905, the method may include obtaining data indicating whether to change the safety zone based on the coordinate information of the hand. For example, the wearable device 101 (e.g., the processor 410) may obtain data indicating whether to change the safety zone, by providing the image including the hand and coordinate information of the hand to a boundary analysis model (e.g., the boundary analysis model 603). The data indicating whether to change the safety zone may include data determining the expansion of the safety zone, data determining the reduction of the safety zone, and data determining the maintenance of the safety zone.

In operation 907, the method may include changing the virtual boundary side for changing the safety zone, based on the data indicating whether to change the safety zone. For example, the wearable device 101 (e.g., the processor 410) may change a virtual boundary side for changing the safety zone, based on the data indicating whether to change the safety zone.

According to an embodiment, the wearable device 101 may change the virtual boundary side to expand the safety zone, based on data determining the expansion of the safety zone. For example, the wearable device 101 may execute operations 805, 807, and 809 of FIG. 8A, based on data determining the expansion of the safety zone.

According to an embodiment, the wearable device 101 may change the virtual boundary side to reduce the safety zone, based on data determining the reduction of the safety zone. For example, the wearable device 101 may execute operation 815 of FIG. 8B, based on data determining the reduction of the safety zone.

Figure 10:
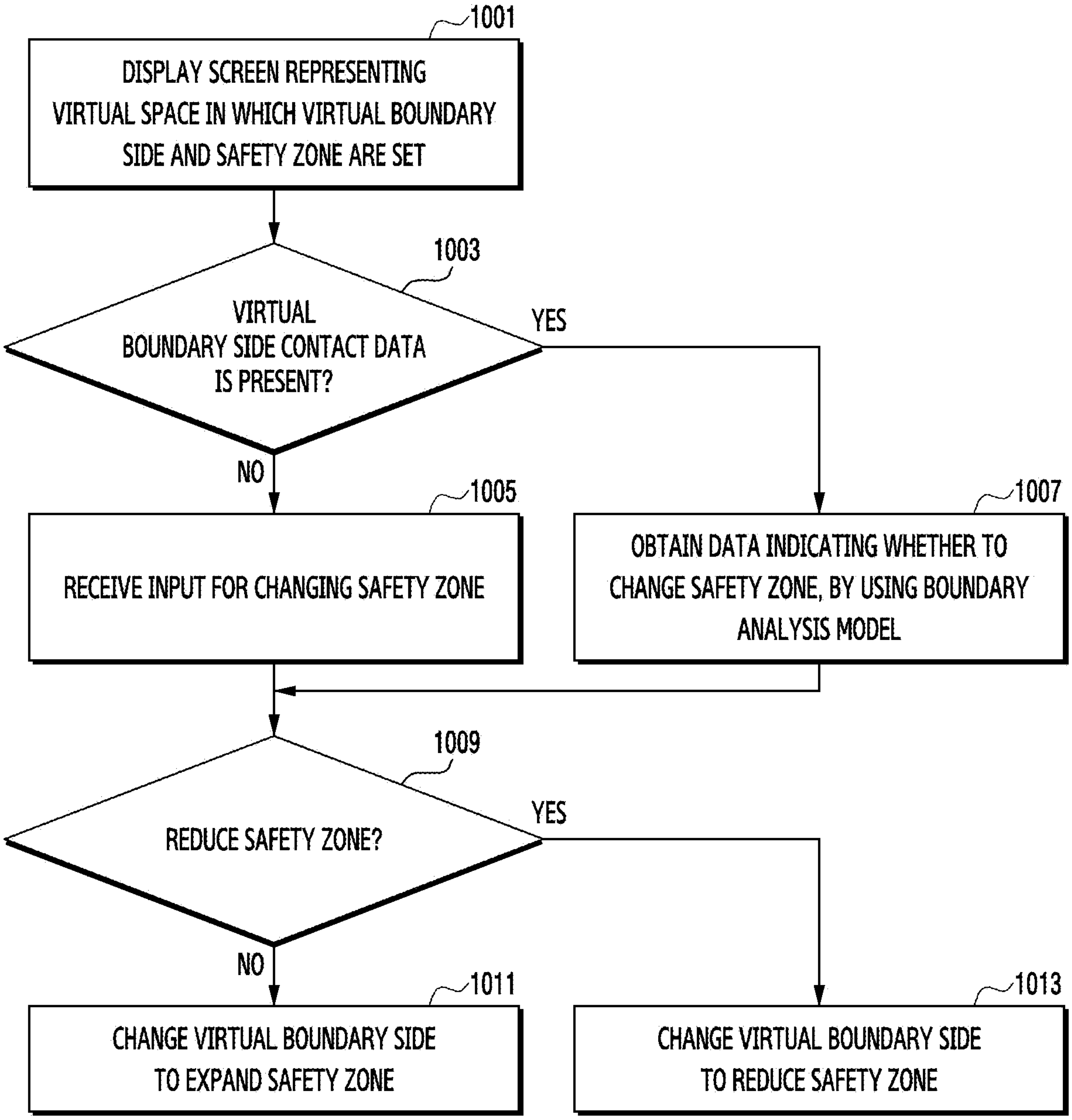
FIG. 10 illustrates an example of operations of a method of a wearable device for changing a virtual boundary side to change a safety zone.

FIG. 10 illustrates an example of operations of a method of a wearable device (e.g., the wearable device 101) for changing a virtual boundary side to change a safety zone.

Referring to FIG. 10, in operation 1001, the method may include displaying a screen representing a virtual space including a virtual boundary side (e.g., the virtual boundary side 711) and a safety zone (e.g., the safety zone 710). For example, the wearable device 101 (e.g., the processor 410) may display, through a display (e.g., the display 250), a screen representing a virtual space in which a virtual boundary side (e.g., the virtual boundary side 711) and a safety zone (e.g., the safety zone 710) surrounded by the virtual boundary side 711 are set. The virtual boundary side 711 may extend from a plane corresponding to a floor. The virtual boundary side 711 may be perpendicular to the plane corresponding to the floor. Operation 1001 may correspond to operation 801 of FIG. 8A.

According to an embodiment, the wearable device 101 may identify a physical environment (or an actual environment) in which the wearable device 101 is located, while displaying a screen representing a virtual space in which the safety zone is set. For example, the wearable device 101 may identify whether a current physical environment in which the wearable device 101 is located is a physical environment in which the wearable device 101 was previously located. For example, the wearable device 101 may use data related to a virtual space that was previously collected or obtained, based on identifying that a current physical environment in which the wearable device 101 is located is a physical environment in which the wearable device 101 was previously located. Data related to a virtual space may include virtual boundary side contact data.

In operation 1003, the method may include identifying whether virtual boundary side contact data is present. For example, the wearable device 101 (e.g., the processor 410) may identify whether virtual boundary side contact data is present. Descriptions of the virtual boundary side contact data of FIG. 6 may be referenced for virtual boundary side contact data. The virtual boundary side contact data may be collected or obtained by the wearable device 101. The virtual boundary side contact data may be described as data corresponding to a body of a user wearing the wearable device 101 moving outside the safety zone. The virtual boundary side contact data may include images representing the body of the user in contact with a virtual boundary side obtained through a camera (e.g., the camera 260). The wearable device 101 may determine whether to expand the safety zone or reduce the safety zone, based on the virtual boundary side contact data. The wearable device 101 may execute operation 1005 based on identifying that the virtual boundary side contact data is not present. The wearable device 101 may execute operation 1007, based on identifying that the virtual boundary side contact data is present.

In operation 1005, the method may include receiving an input for changing the safety zone, based on identifying that virtual boundary side contact data is not present. For example, the wearable device 101 (e.g., the processor 410) may receive an input for changing the safety zone, based on identifying that virtual boundary side contact data is not present. The input for changing the safety zone may include an input for expanding the safety zone and an input for reducing the safety zone.

According to an embodiment, the input for changing the safety zone may include a user input to an interface for changing the safety zone. The wearable device 101 may display an interface for changing the safety zone through a display (e.g., the display 250). For example, the wearable device 101 may overlappingly display an interface for changing the safety zone on a screen representing a virtual space.

According to an embodiment, an input for changing the safety zone may be represented as a voice input and/or a gesture input. For example, while displaying a screen representing a virtual space, the wearable device 101 may receive a voice input for changing the safety zone and/or a gesture input for changing the safety zone.

According to an embodiment, the wearable device 101 may receive an input for changing at least one of a first zone greater than or equal to a designated height and a second zone less than or equal to the designated height. For example, the designated height may be a height set by the wearable device 101. For example, the wearable device 101 may set the designated height based on information on a height of the user included in user information (e.g., the user information 605). For example, the first zone that is greater than or equal to the designated height may correspond to the upper body of the user. For example, the second zone that is less than or equal to the designated height may correspond to the lower body of the user. The wearable device 101 may obtain posture information of the user through a sensor (e.g., the sensor 420) and/or a camera (e.g., the camera 260). The wearable device 101 may set the designated height, based on the user's posture information. The wearable device 101 may receive an input for changing at least one of the first zone and the second zone, according to the user's posture information. For example, the wearable device 101 may determine that a space in which the user's lower body may move is present, according to the user's posture information. The wearable device 101 may recognize determining that a space in which the user's lower body may move is present, as an input for changing the second zone. For example, the wearable device 101 may recognize determining that the user is sitting on a chair according to the user's posture information, as an input for changing the second zone. For example, the wearable device 101 may determine that a space in which the lower body may move is limited, according to the user's posture information. The wearable device 101 may recognize determining that a space in which the lower body may move is limited, as an input for changing the first zone. For example, the wearable device 101 may recognize an input for changing the first zone and the second zone, based on determining that a space in which the upper body and/or lower body may move is present, according to the user's posture information.

In operation 1007, the method may include obtaining data indicating whether to change the safety zone based on identifying that virtual boundary side contact data is present. For example, the wearable device 101 (e.g., the processor 410) may obtain data indicating whether to change the safety zone, by using a boundary analysis model (e.g., the boundary analysis model 603), based on identifying that virtual boundary side contact data is present. Operations 901, 903, and/or 905 of FIG. 9 may be referenced for a process of obtaining data indicating whether to change the safety zone. The data indicating whether to change the safety zone may include data determining the expansion of the safety zone, data determining the reduction of the safety zone, and/or data determining the maintenance of the safety zone.

In operation 1009, the method may include determining whether to reduce the safety zone. For example, the wearable device 101 (e.g., the processor 410) may determine whether to reduce the safety zone. The wearable device 101 may determine whether to change the safety zone. For example, the wearable device 101 may determine whether to change the safety zone based on an input for changing the safety zone received in operation 1005. For example, the wearable device 101 may execute operation 1011, based on (or in response to) receiving an input for expanding the safety zone. For example, the wearable device 101 may execute operation 1013, based on (or in response to) receiving an input for reducing the safety zone. The wearable device 101 may determine the change of the safety zone, based on data indicating whether to change the safety zone, obtained in operation 1007. For example, the wearable device 101 may execute operation 1011, based on data determining the expansion of the safety zone. For example, the wearable device 101 may execute operation 1013 based on data determining the reduction of the safety zone.

As a non-limiting example, the wearable device 101 may refrain from making any change to the virtual boundary side, based on not receiving an input for changing safety zone in 1005 and based on the data from operation 1007 indicating the maintenance of the safety zone. In operation 1011, the method may include changing the virtual boundary side to expand the safety zone. For example, the wearable device 101 (e.g., the processor 410) may change the virtual boundary side to expand the safety zone, based on determining the extension of the safety zone. Operation 1011 may include at least a portion of the operations illustrated in operation 805, operation 807, and/or operation 809 of FIG. 8A.

According to an embodiment, the wearable device 101 may identify a user's hand moving outside the safety zone, based on hand tracking information. The wearable device 101 may identify an external object located outside the safety zone, through a sensor (e.g., the sensor 420). The wearable device 101 may change a virtual boundary side to expand the safety zone, based on location information of an external object and expansion length information. The expansion length information may be determined according to user information (e.g., the user information 605). For example, the expansion length information may correspond to a length from the wearable device 101 to the user's hand. The wearable device 101 may set the extended safety zone in the virtual space. The wearable device 101 may set a virtual boundary side surrounding the extended safety zone. The extended safety zone may be expanded to correspond to expansion length information from the wearable device 101. The extended safety zone may exclude an area corresponding to location information of an external object.

In operation 1013, the method may include changing the virtual boundary side to reduce the safety zone. For example, the wearable device 101 (e.g., the processor 410) may change the virtual boundary side to reduce the safety zone, based on determining the reduction of the safety zone. Operation 1013 may correspond to operation 815 of FIG.

8B. The wearable device 101 may change the virtual boundary side to reduce the safety zone, according to user information (e.g., the user information 605). For example, the amount by which the safety zone is reduced may vary according to an account logged in the wearable device 101. For example, the amount by which the safety zone is reduced may be greater as a value representing a skill level of a user of the account is less. For example, the amount by which the safety zone is reduced may be greater as a time during which the wearable device 101 has been used by the user is shorter. For example, the amount by which the safety zone is reduced may be greater as a playtime of the user is less.

According to an embodiment, a wearable device may include at least one display, at least one sensor, memory including one or more storage media storing instructions, and at least one processor including processing circuitry. The instructions, when executed by the at least one processor individually or collectively, may cause the wearable device to display, via the at least one display, a screen representing a virtual space including a virtual boundary side extended from a plane corresponding a floor and a safety zone corresponding to the virtual boundary side. The instructions, when executed by the at least one processor individually or collectively, may cause the wearable device to receive a first input to adaptively expand the safety zone from a user wearing the wearable device. The instructions, when executed by the at least one processor individually or collectively, may cause the wearable device to based on the first input, identify, based on hand tracking information, a hand of the user moving outside the safety zone. The instructions, when executed by the at least one processor individually or collectively, may cause the wearable device to, based on the first input, identify, via the at least one sensor, a first object located outside the safety zone. The instructions, when executed by the at least one processor individually or collectively, may cause the wearable device to, based on the first input, change, based on location information of the first object and expansion length information corresponding to a length from the wearable device to the hand of the user, the virtual boundary side to expand the safety zone, the expanded safety zone excluding a first area corresponding to the location information of the first object.

According to an embodiment, the instructions, when executed by the at least one processor individually or collectively, may cause the wearable device to, while displaying the screen, identify, via the at least one sensor, a second object moving into the safety zone. The instructions, when executed by the at least one processor individually or collectively, may cause the wearable device to, based on identifying the second object, change the virtual boundary side to exclude a second area corresponding to location information of the second object in the safety zone surrounded by the virtual boundary side.

According to an embodiment, the instructions, when executed by the at least one processor individually or collectively, may cause the wearable device to receive a second input to adaptively reduce the safety zone from the user. The instructions, when executed by the at least one processor individually or collectively, may cause the wearable device to, based on the second input, change the virtual boundary side to reduce the safety zone according to an account logged into the wearable device. According to an embodiment, an amount by which the safety zone is reduced is based on a value indicating a skill level of a user of the account.

According to an embodiment, the instructions, when executed by the at least one processor individually or collectively, may cause the wearable device to receive a second input to adaptively reduce the safety zone from the user. The instructions, when executed by the at least one processor individually or collectively, may cause the wearable device to, based on the second input, change the virtual boundary side to reduce the safety zone according to a playtime of the user. According to an embodiment, an amount by which the safety zone is reduced is based on a value indicating the playtime of the user.

According to an embodiment, the wearable device may further include a camera. The instructions, when executed by the at least one processor individually or collectively, may cause the wearable device to, based on identifying the hand moving outside the safety zone using the hand tracking information, obtain a plurality of images including the hand via the camera, and obtain coordinate information of the hand via the at least one sensor. The instructions, when executed by the at least one processor individually or collectively, may cause the wearable device to obtain data indicating whether to change the safety zone by providing, to a boundary analysis model in the wearable device, the coordinate information and the plurality of images. The instructions, when executed by the at least one processor individually or collectively, may cause the wearable device to, based on the data indicating to change the safety zone, change the virtual boundary side to change the safety zone.

According to an embodiment, the instructions, when executed by the at least one processor individually or collectively, may cause the wearable device to, based on the data indicating to change the safety zone to adaptively expand the safety zone from the user, identify, based on the hand tracking information, the hand moving outside the safety zone. The instructions, when executed by the at least one processor individually or collectively, may cause the wearable device to, based on the data indicating to change the safety zone to adaptively expand the safety zone from the user, identify, via the at least one sensor, a second object located outside the safety zone. The instructions, when executed by the at least one processor individually or collectively, may cause the wearable device to, based on the data indicating to change the safety zone to adaptively expand the safety zone from the user, based on location information of the second object and a playtime of the user, change the virtual boundary side to expand the safety zone.

According to an embodiment, the instructions, when executed by the at least one processor individually or collectively, may cause the wearable device to, based on the data indicating to change the safety zone to adaptively reduce the safety zone from the user, change the virtual boundary side to reduce the safety zone according to a playtime of the user. According to an embodiment, an amount by which the safety zone is reduced is based on a value of the playtime.

According to an embodiment, a form of the first area is a form of the first object.

According to an embodiment, a method performed by a wearable device with at least one display and at least one sensor may include displaying, via the at least one display, a screen representing a virtual space comprising a virtual boundary side extended from a plane corresponding a floor and a safety zone corresponding to the virtual boundary side. The method may include receiving a first input to adaptively expand the safety zone from a user wearing the wearable device. The method may include, based on the first input, identifying, based on hand tracking information, a hand of the user moving outside the safety zone. The method may include identifying, via the at least one sensor, a first object located outside the safety zone. The method may include, based on the first input, changing, based on location information of the first object and expansion length information corresponding to a length from the wearable device to the hand of the user, the virtual boundary side to expand the safety zone, the expanded safety zone excluding a first area corresponding to the location information of the first object.

According to an embodiment, the method may include, while displaying the screen, identifying, via the at least one sensor, a second object moving into the safety zone. The method may include, based on identifying the second object, changing the virtual boundary side to exclude a second area corresponding to location information of the second object in the safety zone surrounded by the virtual boundary side.

According to an embodiment, the method may include receiving a second input to adaptively reduce the safety zone from the user. The method may include, based on the second input, changing the virtual boundary side to reduce the safety zone according to an account logged into the wearable device. According to an embodiment, an amount by which the safety zone is reduced may be based on a value indicating a skill level of a user of the account.

According to an embodiment, the method may include receiving a second input to adaptively reduce the safety zone from the user. The method may include, based on the second input, changing the virtual boundary side to reduce the safety zone according to a playtime of the user. According to an embodiment, an amount by which the safety zone is reduced may be based on a value indicating the playtime of the user.

According to an embodiment, the wearable device may include a camera. The method may include, based on identifying the hand moving outside the safety zone using the hand tracking information, obtaining a plurality of images including the hand via the camera included in the wearable device. The method may include obtaining coordinate information of the hand via the at least one sensor, obtaining data indicating whether to change the safety zone by providing, to a boundary analysis model in the wearable device, the coordinate information and the plurality of images. The method may include, based on the data indicating to change the safety zone, changing the virtual boundary side to change the safety zone.

According to an embodiment, the method may include, based on the data indicating to change the safety zone to adaptively expand the safety zone from the user, identifying, based on the hand tracking information, the hand moving outside the safety zone. The method may include, based on the data indicating to change the safety zone to adaptively expand the safety zone from the user, identifying, via the at least one sensor, a second object located outside the safety zone. The method may include, based on the data indicating to change the safety zone to adaptively expand the safety zone from the user, based on location information of the second object and a playtime of the user, changing the virtual boundary side to expand the safety zone.

According to an embodiment, the method may include, based on the data indicating to change the safety zone to adaptively reduce the safety zone from the user, changing the virtual boundary side to reduce the safety zone according to a playtime of the user. The amount by which the safety zone is reduced may be based on a value of the playtime.

According to an embodiment, a form of the first area is a form of the first object.

According to an embodiment, a non-transitory computer readable storage medium storing one or more programs, the one or more programs may include instructions to, when executed by a wearable device with at least one display and at least one sensor, cause the wearable device to, display, via the at least one display, a screen representing a virtual space including a virtual boundary side extended from a plane corresponding a floor and a safety zone corresponding to the virtual boundary side. The one or more programs may include instructions to, when executed by the wearable device, cause the wearable device to, receive a first input to adaptively expand the safety zone from a user wearing the wearable device. The one or more programs may include instructions to, when executed by the wearable device, cause the wearable device to, based on the first input, identify, based on hand tracking information, a hand of the user moving outside the safety zone. The one or more programs may include instructions to, when executed by the wearable device, cause the wearable device to, based on the first input, identify, via the at least one sensor, a first object located outside the safety zone. The one or more programs may include instructions to, when executed by the wearable device, cause the wearable device to, change, based on location information of the first object and expansion length information corresponding to a length from the wearable device to the hand of the user, the virtual boundary side to expand the safety zone, the expanded safety zone excluding a first area corresponding to the location information of the first object.

According to an embodiment, the one or more programs may include instructions to, when executed by the wearable device, cause the wearable device to, while displaying the screen, identify, via the at least one sensor, a second object moving into the safety zone. The one or more programs may include instructions to, when executed by the wearable device, cause the wearable device to, based on identifying the second object, change the virtual boundary side to exclude a second area corresponding to location information of the second object in the safety zone surrounded by the virtual boundary side.

According to an embodiment, the one or more programs may include instructions to, when executed by the wearable device, cause the wearable device to receive a second input to adaptively reduce the safety zone from the user. The one or more programs may include instructions to, when executed by the wearable device, cause the wearable device to, based on the second input, change the virtual boundary side to reduce the safety zone according to an account logged into the wearable device. According to an embodiment, an amount by which the safety zone is reduced is based on a value indicating a skill level of a user of the account.

According to an embodiment, the one or more programs may include instructions to, when executed by the wearable device, cause the wearable device to receive a second input to adaptively reduce the safety zone from the user. The one or more programs may include instructions to, when executed by the wearable device, cause the wearable device to, based on the second input, change the virtual boundary side to reduce the safety zone according to a playtime of the user. According to an embodiment, an amount by which the safety zone is reduced is based on a value indicating the playtime of the user.

According to an embodiment, the wearable device may include a camera. The one or more programs may include instructions to, when executed by the wearable device, cause the wearable device to, based on identifying the hand moving outside the safety zone using the hand tracking information, obtain a plurality of images including the hand via the camera, and obtain coordinate information of the hand via the at least one sensor. The one or more programs may include instructions to, when executed by the wearable device, cause the wearable device to, obtain data indicating whether to change the safety zone by providing, to a boundary analysis model in the wearable device, the coordinate information and the plurality of images. The one or more programs may include instructions to, when executed by the wearable device, cause the wearable device to, based on the data indicating to change the safety zone, change the virtual boundary side to change the safety zone.

According to an embodiment, the one or more programs may include instructions to, when executed by the wearable device, cause the wearable device to, based on the data indicating to change the safety zone to adaptively expand the safety zone from the user, identify, based on the hand tracking information, the hand moving outside the safety zone. The one or more programs may include instructions to, when executed by the wearable device, cause the wearable device to, based on the data indicating to change the safety zone to adaptively expand the safety zone from the user, identify, via the at least one sensor, a second object located outside the safety zone. The one or more programs may include instructions to, when executed by the wearable device, cause the wearable device to, based on the data indicating to change the safety zone to adaptively expand the safety zone from the user, based on location information of the second object and a playtime of the user, change the virtual boundary side to expand the safety zone.

According to an embodiment, the one or more programs may include instructions to, when executed by the wearable device, cause the wearable device to, based on the data indicating to change the safety zone to adaptively reduce the safety zone from the user, change the virtual boundary side to reduce the safety zone according to a playtime of the user. According to an embodiment, an amount by which the safety zone is reduced is based on a value of the playtime.

According to an embodiment, a form of the first area is a form of the first object.

In an embodiment according to the disclosure, a wearable device (e.g., the wearable device 101) may expand a safety zone by excluding an area occupied by an external object. The wearable device 101 may increase the degree of freedom while maintaining the user's safety, by adaptively expanding the safety zone. Since an activity radius of the user's upper body increases while using a wearable device, a user experience of the wearable device may be enhanced.

The wearable device 101 may reduce the safety zone according to user information (e.g., the user information 605). The wearable device 101 may reduce a safety zone in a user-customized manner. The wearable device 101 may ensure the safety of a user with a low skill level by increasing the amount of reduction as the user's skill level is lower.

The effects that can be obtained from the disclosure are not limited to those described above, and any other effects not mentioned herein will be clearly understood by those having ordinary knowledge in the art to which the disclosure belongs, from the following description.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. In an example case in which the computer program product is distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately provided in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The technical problems to be achieved in this document are not limited to those described above, and other technical problems not mentioned herein will be clearly understood by those having ordinary knowledge in the art to which the disclosure belongs, from the following description.

No claim element is to be construed under the provisions of 35 U.S.C. § 112, sixth paragraph, unless the element is expressly recited using the phrase "means for" or "means".

What is claimed is:

1. A wearable device comprising:
at least one display;
at least one sensor;
memory comprising one or more storage media storing instructions; and
at least one processor comprising processing circuitry,
wherein the instructions, when executed by the at least one processor individually or collectively, cause the wearable device to:
display, via the at least one display, a screen representing a virtual space comprising a virtual boundary side extended from a plane corresponding a floor and a safety zone corresponding to the virtual boundary side,
receive a first input to adaptively expand the safety zone from a user wearing the wearable device, and
based on the first input:
identify, based on hand tracking information, a hand of the user moving outside the safety zone,
identify, via the at least one sensor, a first object located outside the safety zone, and
change, based on location information of the first object and expansion length information corresponding to a length from the wearable device to the hand of the user, the virtual boundary side to expand the safety zone, and
wherein the expanded safety zone excludes a first region corresponding to the location information of the first object, and comprises a second region overlapping the first region in a direction perpendicular to the plane.

2. The wearable device of claim 1, wherein the instructions, when executed by the at least one processor individually or collectively, cause the wearable device to:
while displaying the screen, identify, via the at least one sensor, a second object moving into the safety zone, and
based on identifying the second object, change the virtual boundary side to exclude a third region corresponding to location information of the second object in the safety zone surrounded by the virtual boundary side.

3. The wearable device of claim 1, wherein the instructions, when executed by the at least one processor individually or collectively, cause the wearable device to:
receive a second input to adaptively reduce the safety zone from the user, and
based on the second input, change the virtual boundary side to reduce the safety zone according to an account logged into the wearable device, and
wherein an amount by which the safety zone is reduced is based on a value indicating a skill level of a user of the account.

4. The wearable device of claim 1, wherein the instructions, when executed by the at least one processor individually or collectively, cause the wearable device to:
receive a second input to adaptively reduce the safety zone from the user, and
based on the second input, change the virtual boundary side to reduce the safety zone according to a playtime of the user, and
wherein an amount by which the safety zone is reduced is based on a value indicating the playtime of the user.

5. The wearable device of claim 1, further comprising:
a camera;
wherein the instructions, when executed by the at least one processor individually or collectively, cause the wearable device to:
based on identifying the hand moving outside the safety zone using the hand tracking information, obtain a plurality of images comprising the hand via the camera, and obtain coordinate information of the hand via the at least one sensor,
obtain data indicating whether to change the safety zone by providing, to a boundary analysis model in the wearable device, the coordinate information and the plurality of images, and
based on the data indicating to change the safety zone, change the virtual boundary side to change the safety zone.

6. The wearable device of claim 5, wherein the instructions, when executed by the at least one processor individually or collectively, cause the wearable device to:
based on the data indicating to change the safety zone to adaptively expand the safety zone from the user:
identify, based on the hand tracking information, the hand moving outside the safety zone,
identify, via the at least one sensor, a second object located outside the safety zone, and
based on location information of the second object and a playtime of the user, change the virtual boundary side to expand the safety zone.

7. The wearable device of claim 5, wherein the instructions, when executed by the at least one processor individually or collectively, cause the wearable device to:

based on the data indicating to change the safety zone to adaptively reduce the safety zone from the user, change the virtual boundary side to reduce the safety zone according to a playtime of the user, and wherein an amount by which the safety zone is reduced is based on a value of the playtime.

8. The wearable device of claim 1, wherein a form of the first region is a form of the first object.

9. A method performed by a wearable device including at least one display and at least one sensor, the method comprising:

displaying, via the at least one display, a screen representing a virtual space comprising a virtual boundary side extended from a plane corresponding a floor and a safety zone corresponding to the virtual boundary side, receiving a first input to adaptively expand the safety zone from a user wearing the wearable device, and based on the first input:

identifying, based on hand tracking information, a hand of the user moving outside the safety zone, identifying, via the at least one sensor, a first object located outside the safety zone, and changing, based on location information of the first object and expansion length information corresponding to a length from the wearable device to the hand of the user, the virtual boundary side to expand the safety zone, and wherein the expanded safety zone excludes a first region corresponding to the location information of the first object, and comprises a second region overlapping the first region in a direction perpendicular to the plane.

10. The method of claim 9, further comprising:

while displaying the screen, identifying, via the at least one sensor, a second object moving into the safety zone, and based on identifying the second object, changing the virtual boundary side to exclude a third region corresponding to location information of the second object in the safety zone surrounded by the virtual boundary side.

11. The method of claim 9, further comprising:

receiving a second input to adaptively reduce the safety zone from the user, and based on the second input, changing the virtual boundary side to reduce the safety zone according to an account logged into the wearable device, and wherein an amount by which the safety zone is reduced is based on a value indicating a skill level of a user of the account.

12. The method of claim 9, further comprising:

receiving a second input to adaptively reduce the safety zone from the user, and based on the second input, changing the virtual boundary side to reduce the safety zone according to a playtime of the user, and wherein an amount by which the safety zone is reduced is based on a value indicating the playtime of the user.

13. The method of claim 9, further comprising:

based on identifying the hand moving outside the safety zone using the hand tracking information, obtaining a plurality of images comprising the hand via a camera included in the wearable device, and obtaining coordinate information of the hand via the at least one sensor, obtaining data indicating whether to change the safety zone by providing, to a boundary analysis model in the wearable device, the coordinate information and the plurality of images, and based on the data indicating to change the safety zone, changing the virtual boundary side to change the safety zone.

14. The method of claim 13, comprising:

based on the data indicating to change the safety zone to adaptively expand the safety zone from the user:

identifying, based on the hand tracking information, the hand moving outside the safety zone, identifying, via the at least one sensor, a second object located outside the safety zone, and based on location information of the second object and a playtime of the user, changing the virtual boundary side to expand the safety zone.

15. The method of claim 13, comprising:

based on the data indicating to change the safety zone to adaptively reduce the safety zone from the user, changing the virtual boundary side to reduce the safety zone according to a playtime of the user, and wherein an amount by which the safety zone is reduced is based on a value of the playtime.

16. The method of claim 9, wherein a form of the first region is a form of the first object.

17. A non-transitory computer readable storage medium storing one or more programs, the one or more programs comprising instructions to, when executed by a wearable device with at least one display and at least one sensor, cause the wearable device to:

display, via the at least one display, a screen representing a virtual space comprising a virtual boundary side extended from a plane corresponding a floor and a safety zone corresponding to the virtual boundary side, receive first input to adaptively expand the safety zone from a user wearing the wearable device, and based on the first input:

identify, based on hand tracking information, a hand of the user moving outside the safety zone, identify, via the at least one sensor, a first object located outside the safety zone, and change, based on location information of the first object and expansion length information corresponding to a length from the wearable device to the hand of the user, the virtual boundary side to expand the safety zone, and wherein the expanded safety zone excludes a first region corresponding to the location information of the first object, and comprises a second region overlapping the first region in a direction perpendicular to the plane.

18. The non-transitory computer readable storage medium of claim 17, wherein the one or more programs comprise instructions to, when executed by the wearable device, cause the wearable device to:

while displaying the screen, identify, via the at least one sensor, a second object moving into the safety zone, and based on identifying the second object, change the virtual boundary side to exclude a third region corresponding to location information of the second object in the safety zone surrounding by the virtual boundary side.

19. The non-transitory computer readable storage medium of claim 17, wherein the one or more programs comprise instructions to, when executed by the wearable device, cause the wearable device to:

receive a second input to adaptively reduce the safety zone from the user, and based on the second input, change the virtual boundary side to reduce the safety zone according to an account logged into the wearable device, and wherein an amount by which the safety zone is reduced is based on a value indicating a skill level of a user of the account.

20. The non-transitory computer readable storage medium of claim 17, wherein the one or more programs comprise instructions to, when executed by the wearable device, cause the wearable device to:

receive a second input to adaptively reduce the safety zone from the user, and based on the second input, change the virtual boundary side to reduce the safety zone according to a playtime of the user, and wherein an amount by which the safety zone is reduced is based on a value indicating the playtime of the user.

* * * * *